US008523064B1

(12) United States Patent
Buchheit et al.

(10) Patent No.: US 8,523,064 B1
(45) Date of Patent: *Sep. 3, 2013

(54) GRAPHICAL USER INTERFACE FOR THE CONVERSION OF LOYALTY POINTS FOR SERVICES

(71) Applicants: Brian K. Buchheit, Davie, FL (US); Sean I. Mghie, Boca Raton, FL (US)

(72) Inventors: Brian K. Buchheit, Davie, FL (US); Sean I. Mghie, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,023

(22) Filed: May 21, 2013

Related U.S. Application Data

(63) Continuation of application No. 13/532,342, filed on Jun. 25, 2012, now Pat. No. 8,297,502.

(51) Int. Cl.
*G06K 5/00* (2006.01)

(52) U.S. Cl.
USPC .......... 235/380; 235/375; 235/379; 235/487; 463/25

(58) Field of Classification Search
USPC .......... 235/380, 375, 379, 487, 486; 705/14, 705/39; 463/25
See application file for complete search history.

(56) References Cited

U.S. PATENT DOCUMENTS

| | | | |
|---|---|---|---|
| 3,918,716 A | 11/1975 | Nonaka et al. | |
| 4,087,660 A | 5/1978 | Sedley | |
| 4,358,672 A | 11/1982 | Hyatt et al. | |
| 4,473,825 A | 9/1984 | Walton | |
| 4,518,098 A | 5/1985 | Fleischer | |
| 4,546,241 A | 10/1985 | Walton | |
| 4,582,324 A | 4/1986 | Koza et al. | |
| 4,607,155 A | 8/1986 | Nao et al. | |
| 4,609,812 A | 9/1986 | Drexler | |
| 4,621,814 A | 11/1986 | Stepan et al. | |
| 4,634,848 A | 1/1987 | Shinohara et al. | |

(Continued)

FOREIGN PATENT DOCUMENTS

| | | |
|---|---|---|
| AU | 6484498 | 11/1998 |
| AU | 2497399 | 11/1999 |

(Continued)

OTHER PUBLICATIONS

"At Sports Superstore Online, Shoppers Get More for Their Money; 10,000 Reasons to Shop at Sports Superstore Online", Business Wire Dec. 4, 1998, 2 pp.

(Continued)

*Primary Examiner* — Edwyn Labaze
(74) *Attorney, Agent, or Firm* — Patents on Demand P.A.; Brian K. Buchheit; Scott M. Garrett

(57) ABSTRACT

In one embodiment, a graphical user interface includes a conversion option to convert at least a subset of non-negotiable credits earned from one into entity independent funds in accordance with a conversion ratio. The entity independent funds are accepted by a commerce partner as at least partial payment for goods or services provided by the commerce partner. In absence of converting the non-negotiable credits into entity independent funds, the commerce partner does not accept the non-negotiable credits as payment for goods or services. Responsive to a received selection of the conversion option, the computer presents within the graphical user interface a quantity of available entity independent funds for use as payment for the goods or services provided by the commerce partner. The quantity of available entity independent funds results from converting the subset of non-negotiable credits into the quantity of available entity independent funds in accordance with the conversion ratio.

38 Claims, 3 Drawing Sheets

(56) References Cited

U.S. PATENT DOCUMENTS

| | | |
|---|---|---|
| 4,689,742 A | 8/1987 | Troy et al. |
| 4,695,053 A | 9/1987 | Vazquez |
| 4,760,527 A | 7/1988 | Sidley |
| 4,764,666 A | 8/1988 | Bergeron |
| 4,882,473 A | 11/1989 | Bergeron |
| 4,910,672 A | 3/1990 | Off et al. |
| 4,941,090 A | 7/1990 | McCarthy |
| 4,942,090 A | 7/1990 | Morin |
| 4,968,873 A | 11/1990 | Dethloff |
| 5,025,372 A | 6/1991 | Burton et al. |
| 5,038,022 A | 8/1991 | Lucero |
| 5,056,019 A | 10/1991 | Schultz et al. |
| 5,080,364 A | 1/1992 | Seidman |
| 5,105,184 A | 4/1992 | Pirani et al. |
| 5,117,355 A | 5/1992 | McCarthy |
| 5,128,752 A | 7/1992 | Von Kohorn |
| 5,135,224 A | 8/1992 | Yamamoto |
| 5,173,851 A | 12/1992 | Off et al. |
| 5,179,517 A | 1/1993 | Sarbin et al. |
| 5,200,889 A | 4/1993 | Mori |
| 5,202,826 A | 4/1993 | McCarthy |
| 5,233,514 A | 8/1993 | Ayyoubi et al. |
| 5,237,620 A | 8/1993 | Deaton et al. |
| 5,256,863 A | 10/1993 | Ferguson et al. |
| 5,265,874 A | 11/1993 | Dickinson |
| 5,276,312 A | 1/1994 | McCarthy |
| 5,287,268 A | 2/1994 | McCarthy |
| 5,287,269 A | 2/1994 | Dorrough et al. |
| 5,290,033 A | 3/1994 | Bittner et al. |
| 5,305,196 A | 4/1994 | Deaton et al. |
| 5,327,508 A | 7/1994 | Deaton et al. |
| 5,332,076 A | 7/1994 | Ziegert |
| 5,344,144 A | 9/1994 | Canon |
| 5,353,218 A | 10/1994 | De Lapa et al. |
| 5,371,345 A | 12/1994 | LeStrange et al. |
| 5,373,440 A | 12/1994 | Cohen et al. |
| 5,382,779 A | 1/1995 | Gupta |
| 5,388,165 A | 2/1995 | Deaton et al. |
| 5,393,061 A | 2/1995 | Manship et al. |
| 5,397,125 A | 3/1995 | Adams |
| 5,398,932 A | 3/1995 | Eberhardt et al. |
| 5,402,872 A | 4/1995 | Clurman |
| 5,424,524 A | 6/1995 | Ruppert et al. |
| 5,429,361 A | 7/1995 | Raven et al. |
| 5,430,644 A | 7/1995 | Deaton et al. |
| 5,434,394 A | 7/1995 | Roach et al. |
| 5,448,471 A | 9/1995 | Deaton et al. |
| 5,457,306 A | 10/1995 | Lucero |
| 5,467,269 A | 11/1995 | Flaten |
| 5,470,079 A | 11/1995 | LeStrange et al. |
| 5,471,669 A | 11/1995 | Lidman |
| 5,477,038 A | 12/1995 | Levine et al. |
| 5,483,444 A | 1/1996 | Heintzeman et al. |
| 5,491,326 A | 2/1996 | Marceau et al. |
| 5,502,363 A | 3/1996 | Tasch et al. |
| 5,511,781 A | 4/1996 | Wood et al. |
| 5,513,102 A | 4/1996 | Auriemma |
| 5,529,361 A | 6/1996 | Bell |
| 5,535,407 A | 7/1996 | Yanagawa et al. |
| 5,537,314 A | 7/1996 | Kanter |
| 5,551,692 A | 9/1996 | Pettit et al. |
| 5,559,312 A | 9/1996 | Lucero |
| 5,559,313 A | 9/1996 | Claus et al. |
| 5,564,546 A | 10/1996 | Molbak et al. |
| 5,564,700 A | 10/1996 | Celona |
| 5,580,309 A | 12/1996 | Piechowiak |
| 5,586,936 A | 12/1996 | Bennett et al. |
| 5,592,560 A | 1/1997 | Deaton et al. |
| 5,609,337 A | 3/1997 | Clapper, Jr. |
| 5,612,868 A | 3/1997 | Off et al. |
| 5,613,912 A | 3/1997 | Slater |
| 5,621,812 A | 4/1997 | Deaton et al. |
| 5,635,696 A | 6/1997 | Dabrowski |
| 5,638,457 A | 6/1997 | Deaton et al. |
| 5,642,485 A | 6/1997 | Deaton et al. |
| 5,643,088 A | 7/1997 | Vaughn et al. |
| 5,644,723 A | 7/1997 | Deaton et al. |
| 5,649,114 A | 7/1997 | Deaton et al. |
| 5,649,115 A | 7/1997 | Schrader et al. |
| 5,655,961 A | 8/1997 | Acres et al. |
| 5,659,469 A | 8/1997 | Deaton et al. |
| 5,672,109 A | 9/1997 | Natanian |
| 5,673,322 A | 9/1997 | Pepe et al. |
| 5,674,123 A | 10/1997 | Roberson, Jr. et al. |
| 5,675,662 A | 10/1997 | Deaton et al. |
| 5,677,952 A | 10/1997 | Blakley, III et al. |
| 5,687,322 A | 11/1997 | Deaton et al. |
| 5,689,100 A | 11/1997 | Carrithers et al. |
| 5,697,611 A | 12/1997 | Kelly et al. |
| 5,708,782 A | 1/1998 | Larson et al. |
| 5,710,886 A | 1/1998 | Christensen et al. |
| 5,715,399 A | 2/1998 | Bezos |
| 5,725,428 A | 3/1998 | Achmuller |
| 5,729,693 A | 3/1998 | Holda-Fleck |
| 5,734,838 A | 3/1998 | Robinson et al. |
| 5,741,183 A | 4/1998 | Acres |
| 5,742,845 A | 4/1998 | Wagner |
| 5,749,075 A | 5/1998 | Toader et al. |
| 5,754,655 A | 5/1998 | Hughes |
| 5,761,647 A | 6/1998 | Boushy |
| 5,761,648 A | 6/1998 | Golden et al. |
| 5,765,141 A | 6/1998 | Spector |
| 5,766,075 A | 6/1998 | Cook et al. |
| 5,769,716 A | 6/1998 | Saffari et al. |
| 5,770,533 A | 6/1998 | Franchi |
| 5,774,868 A | 6/1998 | Cragun et al. |
| 5,774,869 A | 6/1998 | Toader |
| 5,774,870 A | 6/1998 | Storey |
| 5,779,242 A | 7/1998 | Kaufmann |
| 5,779,549 A | 7/1998 | Walker et al. |
| 5,794,230 A | 8/1998 | Horadan et al. |
| 5,802,275 A | 9/1998 | Blonder |
| 5,806,043 A | 9/1998 | Toader |
| 5,806,044 A | 9/1998 | Powell |
| 5,806,045 A | 9/1998 | Biorge et al. |
| 5,809,482 A | 9/1998 | Strisower |
| 5,814,796 A | 9/1998 | Benson et al. |
| 5,816,918 A | 10/1998 | Kelly et al. |
| 5,820,460 A | 10/1998 | Fulton |
| 5,822,230 A | 10/1998 | Kikinis et al. |
| 5,823,874 A | 10/1998 | Adams |
| 5,832,457 A | 11/1998 | O'Brien et al. |
| 5,832,458 A | 11/1998 | Jones |
| 5,833,536 A | 11/1998 | Davids et al. |
| 5,834,748 A | 11/1998 | Litman |
| 5,836,817 A | 11/1998 | Acres |
| 5,839,117 A | 11/1998 | Cameron et al. |
| 5,844,230 A | 12/1998 | Lalonde |
| 5,845,259 A | 12/1998 | West et al. |
| 5,848,399 A | 12/1998 | Burke |
| 5,851,148 A | 12/1998 | Brune et al. |
| 5,855,007 A | 12/1998 | Jovicic et al. |
| D404,436 S | 1/1999 | McGahn et al. |
| 5,857,175 A | 1/1999 | Day et al. |
| 5,864,822 A | 1/1999 | Baker, III |
| RE36,116 E | 2/1999 | McCarthy |
| 5,870,722 A | 2/1999 | Albert et al. |
| 5,876,284 A | 3/1999 | Acres et al. |
| 5,882,261 A | 3/1999 | Adams |
| 5,882,262 A | 3/1999 | Ballhorn |
| 5,884,277 A | 3/1999 | Khosla |
| 5,892,827 A | 4/1999 | Beach et al. |
| 5,892,900 A | 4/1999 | Ginter et al. |
| 5,892,905 A | 4/1999 | Brandt et al. |
| 5,898,838 A | 4/1999 | Wagner |
| 5,902,184 A | 5/1999 | Bennett |
| 5,902,983 A | 5/1999 | Crevelt et al. |
| 5,903,874 A | 5/1999 | Leonard et al. |
| 5,903,880 A | 5/1999 | Biffar |
| 5,905,246 A | 5/1999 | Fajkowski |
| 5,905,908 A | 5/1999 | Wagner |
| 5,907,830 A | 5/1999 | Engel et al. |
| 5,907,831 A | 5/1999 | Lotvin et al. |
| 5,909,023 A | 6/1999 | Ono et al. |

| | | | | | | |
|---|---|---|---|---|---|---|
| 5,909,486 A | 6/1999 | Walker et al. | | 6,032,136 A | 2/2000 | Brake, Jr. et al. |
| 5,911,418 A | 6/1999 | Adams | | 6,032,955 A | 3/2000 | Luciano et al. |
| 5,913,210 A | 6/1999 | Call | | 6,035,280 A | 3/2000 | Christensen |
| 5,915,007 A | 6/1999 | Klapka | | 6,035,281 A | 3/2000 | Crosskey et al. |
| 5,915,019 A | 6/1999 | Ginter et al. | | 6,036,601 A | 3/2000 | Heckel |
| 5,915,243 A | 6/1999 | Smolen | | 6,038,321 A | 3/2000 | Torigai et al. |
| 5,915,244 A | 6/1999 | Jack et al. | | 6,039,244 A | 3/2000 | Finsterwald |
| 5,918,211 A | 6/1999 | Sloane | | 6,039,648 A | 3/2000 | Guinn |
| 5,918,213 A | 6/1999 | Bernard et al. | | 6,041,308 A | 3/2000 | Walker et al. |
| 5,918,214 A | 6/1999 | Perkowski | | 6,041,309 A | 3/2000 | Laor |
| 5,919,091 A | 7/1999 | Bell et al. | | 6,044,360 A | 3/2000 | Picciallo |
| 5,920,847 A | 7/1999 | Kolling et al. | | 6,047,269 A | 4/2000 | Biffar |
| 5,923,016 A | 7/1999 | Fredregill et al. | | 6,048,269 A | 4/2000 | Burns |
| 5,933,811 A | 8/1999 | Angles et al. | | 6,049,778 A | 4/2000 | Walker et al. |
| 5,935,000 A | 8/1999 | Sanchez, III et al. | | 6,049,779 A | 4/2000 | Berkson |
| 5,937,391 A | 8/1999 | Ikeda et al. | | 6,055,573 A | 4/2000 | Gardenswartz et al. |
| 5,937,394 A | 8/1999 | Wong et al. | | 6,058,371 A | 5/2000 | Djian |
| 5,938,727 A | 8/1999 | Ikeda | | 6,058,482 A | 5/2000 | Liu |
| 5,940,506 A | 8/1999 | Chang et al. | | 6,061,660 A | 5/2000 | Eggleston et al. |
| 5,941,771 A | 8/1999 | Haste, III | | 6,062,980 A | 5/2000 | Luciano |
| 5,941,772 A | 8/1999 | Paige | | 6,064,979 A | 5/2000 | Perkowski |
| 5,943,241 A | 8/1999 | Nichols et al. | | 6,064,987 A | 5/2000 | Walker et al. |
| 5,946,664 A | 8/1999 | Ebisawa | | 6,065,120 A | 5/2000 | Laursen et al. |
| 5,947,820 A | 9/1999 | Morro et al. | | 6,068,553 A | 5/2000 | Parker |
| 5,949,042 A | 9/1999 | Dietz, II et al. | | 6,072,468 A | 6/2000 | Hocker et al. |
| 5,950,173 A | 9/1999 | Perkowski | | 6,073,840 A | 6/2000 | Marion |
| 5,951,397 A | 9/1999 | Dickinson | | 6,075,863 A | 6/2000 | Krishnan et al. |
| 5,952,638 A | 9/1999 | Demers et al. | | 6,076,101 A | 6/2000 | Kamakura et al. |
| 5,953,005 A | 9/1999 | Liu | | 6,078,898 A | 6/2000 | Davis et al. |
| 5,956,038 A | 9/1999 | Rekimoto | | 6,081,900 A | 6/2000 | Subramaniam et al. |
| 5,956,695 A | 9/1999 | Carrithers et al. | | 6,088,730 A | 7/2000 | Kato et al. |
| 5,956,700 A | 9/1999 | Landry | | 6,089,982 A | 7/2000 | Holch |
| 5,959,277 A | 9/1999 | Lucero | | 6,092,069 A | 7/2000 | Johnson et al. |
| 5,967,896 A | 10/1999 | Jorasch et al. | | 6,092,201 A | 7/2000 | Turnbull et al. |
| 5,970,469 A | 10/1999 | Scroggie et al. | | 6,094,486 A | 7/2000 | Marchant |
| 5,970,470 A | 10/1999 | Walker | | 6,098,837 A | 8/2000 | Izawa |
| 5,971,277 A | 10/1999 | Cragun et al. | | 6,101,483 A | 8/2000 | Petrovich et al. |
| 5,974,135 A | 10/1999 | Breneman et al. | | 6,101,484 A | 8/2000 | Halbert et al. |
| 5,974,398 A | 10/1999 | Hanson et al. | | 6,101,485 A | 8/2000 | Fortenberry et al. |
| 5,978,777 A | 11/1999 | Garnier | | 6,105,001 A | 8/2000 | Masi et al. |
| 5,979,757 A | 11/1999 | Tracy et al. | | 6,105,865 A | 8/2000 | Hardesty |
| 5,980,385 A | 11/1999 | Clapper | | 6,110,041 A | 8/2000 | Walker et al. |
| 5,982,520 A | 11/1999 | Weiser et al. | | 6,110,042 A | 8/2000 | Walker et al. |
| 5,983,196 A | 11/1999 | Wendkos | | 6,113,098 A | 9/2000 | Adams |
| 5,983,205 A | 11/1999 | Brams et al. | | 6,113,495 A | 9/2000 | Walker et al. |
| 5,984,191 A | 11/1999 | Chapin, Jr. | | 6,115,737 A | 9/2000 | Ely et al. |
| 5,988,500 A | 11/1999 | Litman | | 6,119,229 A | 9/2000 | Martinez |
| 5,991,376 A | 11/1999 | Hennessy et al. | | 6,119,230 A | 9/2000 | Carter |
| 5,991,736 A | 11/1999 | Ferguson et al. | | 6,124,947 A | 9/2000 | Seo |
| 5,992,738 A | 11/1999 | Matsumoto et al. | | 6,126,542 A | 10/2000 | Fier |
| 5,992,752 A | 11/1999 | Wilz, Sr. et al. | | 6,128,599 A | 10/2000 | Walker et al. |
| 5,993,316 A | 11/1999 | Coyle | | 6,128,603 A | 10/2000 | Dent et al. |
| 5,995,942 A | 11/1999 | Smith et al. | | 6,129,274 A | 10/2000 | Suzuki |
| 5,999,624 A | 12/1999 | Hopkins | | 6,131,810 A | 10/2000 | Weiss et al. |
| 5,999,914 A | 12/1999 | Blinn et al. | | 6,134,318 A | 10/2000 | O'Neil |
| 6,000,608 A | 12/1999 | Dorf | | 6,134,548 A | 10/2000 | Gottsman et al. |
| 6,002,771 A | 12/1999 | Nielsen | | 6,138,911 A | 10/2000 | Fredregill et al. |
| 6,003,013 A | 12/1999 | Boushy et al. | | 6,139,431 A | 10/2000 | Walker et al. |
| 6,007,426 A | 12/1999 | Kelly et al. | | 6,141,161 A | 10/2000 | Sato et al. |
| 6,009,411 A | 12/1999 | Kepecs | | 6,141,653 A | 10/2000 | Conklin |
| 6,009,412 A | 12/1999 | Storey | | 6,141,684 A | 10/2000 | McDonald et al. |
| 6,009,458 A | 12/1999 | Hawkins | | 6,145,739 A | 11/2000 | Bertina et al. |
| 6,012,038 A | 1/2000 | Powell | | 6,148,405 A | 11/2000 | Liao et al. |
| 6,012,051 A | 1/2000 | Sammon, Jr. et al. | | 6,154,214 A | 11/2000 | Uyehara et al. |
| 6,012,636 A | 1/2000 | Smith | | 6,161,096 A | 12/2000 | Bell |
| 6,014,594 A | 1/2000 | Heidel | | 6,162,122 A | 12/2000 | Acres |
| 6,014,634 A | 1/2000 | Scroggie et al. | | 6,164,533 A | 12/2000 | Barton |
| 6,014,635 A | 1/2000 | Harris et al. | | 6,165,071 A | 12/2000 | Weiss |
| 6,015,344 A | 1/2000 | Kelly et al. | | 6,168,522 B1 | 1/2001 | Walker |
| 6,016,476 A | 1/2000 | Maes et al. | | 6,173,267 B1 | 1/2001 | Cairns |
| 6,018,695 A | 1/2000 | Ahrens et al. | | 6,178,407 B1 | 1/2001 | Lotvin et al. |
| 6,018,718 A | 1/2000 | Walker et al. | | 6,178,408 B1 | 1/2001 | Copple et al. |
| 6,018,724 A | 1/2000 | Arent | | 6,182,894 B1 | 2/2001 | Hackett et al. |
| 6,021,399 A | 2/2000 | Demers et al. | | 6,183,362 B1 | 2/2001 | Boushy |
| 6,024,640 A | 2/2000 | Walker et al. | | 6,183,366 B1 | 2/2001 | Goldberg et al. |
| 6,026,370 A | 2/2000 | Jermyn | | 6,185,541 B1 | 2/2001 | Scroggie et al. |
| 6,026,375 A | 2/2000 | Hall et al. | | 6,186,893 B1 | 2/2001 | Walker et al. |
| 6,026,377 A | 2/2000 | Burke | | 6,186,894 B1 | 2/2001 | Mayeroff |
| 6,032,133 A | 2/2000 | Hilt et al. | | 6,189,103 B1 | 2/2001 | Nevarez et al. |

| Patent | Date | Inventor |
|---|---|---|
| 6,193,608 B1 | 2/2001 | Walker et al. |
| 6,195,677 B1 | 2/2001 | Utsumi |
| 6,196,458 B1 | 3/2001 | Walker et al. |
| 6,199,099 B1 | 3/2001 | Gershman et al. |
| 6,216,129 B1 | 4/2001 | Eldering |
| 6,222,914 B1 | 4/2001 | McMullin |
| 6,224,483 B1 | 5/2001 | Mayeroff |
| 6,227,972 B1 | 5/2001 | Walker et al. |
| 6,229,533 B1 | 5/2001 | Farmer |
| 6,231,442 B1 | 5/2001 | Mayeroff |
| 6,234,896 B1 | 5/2001 | Walker et al. |
| 6,236,978 B1 | 5/2001 | Tuzhilin |
| 6,243,688 B1 | 6/2001 | Kalina |
| 6,244,958 B1 | 6/2001 | Acres |
| 6,249,773 B1 | 6/2001 | Allard et al. |
| 6,267,671 B1 | 7/2001 | Hogan |
| 6,273,820 B1 | 8/2001 | Haste, III |
| 6,280,326 B1 | 8/2001 | Saunders |
| 6,280,328 B1 | 8/2001 | Holch |
| 6,289,261 B1 | 9/2001 | Heidel |
| 6,289,322 B1 | 9/2001 | Kitchen et al. |
| 6,292,786 B1 | 9/2001 | Deaton et al. |
| 6,293,865 B1 | 9/2001 | Kelly et al. |
| 6,293,866 B1 | 9/2001 | Walker et al. |
| 6,293,867 B1 | 9/2001 | Heidel |
| 6,298,335 B1 | 10/2001 | Bernstein |
| 6,302,793 B1 | 10/2001 | Fertitta |
| 6,306,035 B1 | 10/2001 | Kelly |
| 6,311,976 B1 | 11/2001 | Yoseloff |
| 6,312,333 B1 | 11/2001 | Acres |
| 6,315,665 B1 | 11/2001 | Faith |
| 6,319,125 B1 | 11/2001 | Acres |
| 6,327,573 B1 | 12/2001 | Walker et al. |
| 6,332,099 B1 | 12/2001 | Heidel |
| 6,332,157 B1 | 12/2001 | Mighdoll et al. |
| 6,336,098 B1 | 1/2002 | Fortenberry et al. |
| 6,341,353 B1 | 1/2002 | Herman |
| 6,345,261 B1 | 2/2002 | Feidelson et al. |
| 6,352,175 B2 | 3/2002 | Izawa |
| 6,358,149 B1 | 3/2002 | Schneider et al. |
| 6,363,362 B1 | 3/2002 | Burfield et al. |
| 6,379,247 B1 | 4/2002 | Walker et al. |
| 6,394,907 B1 | 5/2002 | Rowe |
| 6,402,029 B1 | 6/2002 | Gangi |
| 6,408,284 B1 | 6/2002 | Hill et al. |
| 6,431,983 B2 | 8/2002 | Acres |
| 6,438,527 B1 | 8/2002 | Powar |
| 6,452,498 B2 | 9/2002 | Stewart |
| 6,476,830 B1 | 11/2002 | Farmer |
| 6,484,940 B1 | 11/2002 | Dilday et al. |
| 6,486,768 B1 | 11/2002 | French et al. |
| 6,491,584 B2 | 12/2002 | Graham |
| 6,505,772 B1 | 1/2003 | Mollett et al. |
| 6,510,998 B1 | 1/2003 | Stanford et al. |
| 6,511,377 B1 | 1/2003 | Weiss |
| 6,522,889 B1 | 2/2003 | Aarnio |
| 6,533,664 B1 | 3/2003 | Crumby |
| 6,547,131 B1 | 4/2003 | Foodman |
| 6,549,912 B1 | 4/2003 | Chen |
| 6,554,705 B1 | 4/2003 | Cumbers |
| 6,572,471 B1 | 6/2003 | Bennett |
| 6,575,832 B1 | 6/2003 | Manfredi et al. |
| 6,578,015 B1 | 6/2003 | Haseltine et al. |
| 6,579,179 B2 | 6/2003 | Poole |
| 6,593,640 B1 | 7/2003 | Kalnitsky et al. |
| 6,601,040 B1 | 7/2003 | Kolls |
| 6,607,441 B1 | 8/2003 | Acres |
| 6,609,150 B2 | 8/2003 | Lee et al. |
| 6,609,969 B1 | 8/2003 | Luciano |
| 6,609,970 B1 | 8/2003 | Luciano |
| 6,609,978 B1 | 8/2003 | Paulsen |
| 6,623,357 B2 | 9/2003 | Chowdhury |
| 6,629,890 B2 | 10/2003 | Johnson |
| 6,631,358 B1 | 10/2003 | Ogilvie |
| 6,631,849 B2 | 10/2003 | Blossom |
| 6,645,077 B2 | 11/2003 | Rowe |
| 6,648,755 B1 | 11/2003 | Luciano, Jr. |
| 6,656,050 B2 | 12/2003 | Busch |
| 6,685,559 B2 | 2/2004 | Luciano |
| 6,687,679 B1 | 2/2004 | Van Luchene et al. |
| 6,721,743 B1 | 4/2004 | Sakakibara |
| 6,748,365 B1 | 6/2004 | Quinlan et al. |
| 6,800,029 B2 | 10/2004 | Rowe |
| 6,813,609 B2 | 11/2004 | Wilson |
| 6,824,464 B2 | 11/2004 | Weil et al. |
| 6,826,594 B1 | 11/2004 | Pettersen |
| 6,837,436 B2 | 1/2005 | Swartz et al. |
| 6,842,739 B2 | 1/2005 | Postrel |
| 6,843,720 B2 | 1/2005 | Luciano |
| 6,846,238 B2 | 1/2005 | Wells |
| 6,852,031 B1 | 2/2005 | Rowe |
| 6,856,976 B2 | 2/2005 | Bible et al. |
| 6,866,586 B2 | 3/2005 | Oberberger |
| 6,898,570 B1 | 5/2005 | Tedesco et al. |
| 6,915,271 B1 | 7/2005 | Meyer et al. |
| 6,920,611 B1 | 7/2005 | Spaeth et al. |
| 6,929,550 B2 | 8/2005 | Hisada |
| 6,931,538 B1 | 8/2005 | Sawaguchi |
| 6,947,898 B2 | 9/2005 | Postrel |
| 6,951,302 B2 | 10/2005 | Potts |
| 6,985,876 B1 | 1/2006 | Lee |
| 6,997,807 B2 | 2/2006 | Weiss |
| 7,003,496 B2 | 2/2006 | Ishii et al. |
| 7,021,531 B2 | 4/2006 | Myttenaere |
| 7,025,674 B2 | 4/2006 | Adams et al. |
| 7,043,752 B2 | 5/2006 | Royer et al. |
| 7,072,864 B2 | 7/2006 | Brake, Jr. et al. |
| 7,096,190 B2 | 8/2006 | Postrel |
| 7,124,109 B2 | 10/2006 | Sakamoto et al. |
| 7,127,414 B1 | 10/2006 | Awadallah et al. |
| 7,128,652 B1 | 10/2006 | Lavoie |
| 7,130,828 B2 | 10/2006 | Phillips et al. |
| 7,134,087 B2 | 11/2006 | Bushold et al. |
| 7,134,959 B2 | 11/2006 | Penrice |
| 7,137,883 B1 | 11/2006 | Falciglia |
| 7,146,342 B1 | 12/2006 | Angelin |
| 7,156,738 B2 | 1/2007 | Rowe |
| 7,163,145 B2 | 1/2007 | Cohagan et al. |
| 7,168,089 B2 | 1/2007 | Nguyen |
| 7,174,315 B2 | 2/2007 | Phillips et al. |
| 7,187,947 B1 | 3/2007 | White et al. |
| 7,200,571 B1 | 4/2007 | Jenniges et al. |
| 7,249,139 B2 | 7/2007 | Chuah |
| 7,249,197 B1 | 7/2007 | Roestenburg et al. |
| 7,289,970 B1 | 10/2007 | Siegel |
| 7,290,061 B2 | 10/2007 | Lentini et al. |
| 7,291,064 B2 | 11/2007 | Yamada |
| 7,321,901 B1 | 1/2008 | Blinn et al. |
| 7,329,185 B2 | 2/2008 | Conover et al. |
| 7,341,518 B2 | 3/2008 | Muskin |
| 7,349,867 B2 | 3/2008 | Rollins et al. |
| 7,360,693 B1 | 4/2008 | Sullivan |
| 7,360,699 B2 | 4/2008 | Cohagan et al. |
| 7,387,571 B2 | 6/2008 | Walker |
| 7,390,264 B2 | 6/2008 | Walker |
| 7,398,226 B2 | 7/2008 | Haines et al. |
| 7,410,422 B2 | 8/2008 | Fine |
| 7,455,586 B2 | 11/2008 | Nguyen |
| 7,613,629 B2 | 11/2009 | Antonucci et al. |
| 7,636,874 B2 | 12/2009 | Gutbrod et al. |
| 7,641,547 B2 | 1/2010 | Walker et al. |
| 7,680,688 B2 | 3/2010 | Hessburg |
| 7,703,673 B2 | 4/2010 | Buchheit et al. |
| 7,747,463 B1 | 6/2010 | Phillips et al. |
| 7,765,124 B2 | 7/2010 | Postrel |
| 7,827,056 B2 | 11/2010 | Walker et al. |
| 7,827,057 B1 | 11/2010 | Walker et al. |
| 7,828,206 B2 | 11/2010 | Hessburg et al. |
| 7,856,376 B2 | 12/2010 | Storey |
| 7,856,377 B2 | 12/2010 | Cohagan et al. |
| 7,867,079 B2 | 1/2011 | Govender et al. |
| 7,925,533 B2 | 4/2011 | Shaw et al. |
| 8,019,679 B2 | 9/2011 | Bennett et al. |
| 8,046,256 B2 | 10/2011 | Chien et al. |
| 8,062,116 B2 | 11/2011 | Lutnick et al. |
| 8,100,758 B2 | 1/2012 | Walker et al. |
| 8,123,127 B2 | 2/2012 | McGhie et al. |
| 8,162,209 B2 | 4/2012 | Buchheit et al. |

| Patent/Pub. No. | Date | Name |
|---|---|---|
| 8,181,863 B1 | 5/2012 | McGhie et al. |
| 8,181,864 B1 | 5/2012 | McGhie et al. |
| 8,186,583 B1 | 5/2012 | McGhie et al. |
| 8,201,734 B1 | 6/2012 | McGhie et al. |
| 8,234,164 B2 | 7/2012 | Walker et al. |
| 8,245,925 B1 | 8/2012 | McGhie et al. |
| 8,265,993 B2 | 9/2012 | Chien et al. |
| 8,267,315 B1 | 9/2012 | McGhie et al. |
| 8,297,502 B1 | 10/2012 | McGhie et al. |
| 8,298,074 B1 | 10/2012 | Gibase et al. |
| 2001/0032137 A1 | 10/2001 | Bennett et al. |
| 2001/0032182 A1 | 10/2001 | Kumar et al. |
| 2001/0032183 A1 | 10/2001 | Landry |
| 2001/0034259 A1 | 10/2001 | Luciano et al. |
| 2001/0034649 A1 | 10/2001 | Acres |
| 2001/0034653 A1 | 10/2001 | Yamamoto |
| 2001/0034720 A1 | 10/2001 | Armes |
| 2001/0037295 A1 | 11/2001 | Olsen |
| 2001/0041610 A1 | 11/2001 | Luciano et al. |
| 2001/0044337 A1 | 11/2001 | Rowe |
| 2001/0046891 A1 | 11/2001 | Acres |
| 2001/0047342 A1 | 11/2001 | Cuervo |
| 2001/0054003 A1 | 12/2001 | Chien et al. |
| 2001/0054010 A1 | 12/2001 | Bernabeo et al. |
| 2002/0002075 A1 | 1/2002 | Rowe |
| 2002/0002532 A1 | 1/2002 | Tso |
| 2002/0002538 A1 | 1/2002 | Ling |
| 2002/0010025 A1 | 1/2002 | Kelly et al. |
| 2002/0013728 A1 | 1/2002 | Wilkman |
| 2002/0013767 A1 | 1/2002 | Katz |
| 2002/0016734 A1 | 2/2002 | McGill et al. |
| 2002/0020965 A1 | 2/2002 | Potter |
| 2002/0026348 A1 | 2/2002 | Fowler et al. |
| 2002/0039923 A1 | 4/2002 | Cannon |
| 2002/0045476 A1 | 4/2002 | Poole |
| 2002/0046110 A1 | 4/2002 | Gallagher |
| 2002/0049631 A1 | 4/2002 | Williams |
| 2002/0052940 A1 | 5/2002 | Myers et al. |
| 2002/0055874 A1 | 5/2002 | Cohen |
| 2002/0056044 A1 | 5/2002 | Andersson |
| 2002/0062253 A1 | 5/2002 | Dosh et al. |
| 2002/0065126 A1 | 5/2002 | Miller et al. |
| 2002/0068624 A1 | 6/2002 | Ellis |
| 2002/0069109 A1 | 6/2002 | Wendkos |
| 2002/0069150 A1 | 6/2002 | Ni |
| 2002/0072412 A1 | 6/2002 | Young |
| 2002/0075844 A1 | 6/2002 | Hagen |
| 2002/0077173 A1 | 6/2002 | Luciano et al. |
| 2002/0077890 A1 | 6/2002 | LaPointe et al. |
| 2002/0077978 A1 | 6/2002 | O'Leary et al. |
| 2002/0082918 A1 | 6/2002 | Warwick |
| 2002/0082920 A1 | 6/2002 | Austin |
| 2002/0082990 A1 | 6/2002 | Jones |
| 2002/0086733 A1 | 7/2002 | Wang |
| 2002/0087468 A1 | 7/2002 | Ganesan et al. |
| 2002/0091593 A1 | 7/2002 | Fowler |
| 2002/0095365 A1 | 7/2002 | Slavin et al. |
| 2002/0107072 A1 | 8/2002 | Giobbi |
| 2002/0107733 A1 | 8/2002 | Liu et al. |
| 2002/0111210 A1 | 8/2002 | Luciano, Jr. |
| 2002/0111907 A1 | 8/2002 | Ling |
| 2002/0111919 A1 | 8/2002 | Weller et al. |
| 2002/0116257 A1 | 8/2002 | Helbig |
| 2002/0120513 A1 | 8/2002 | Webb et al. |
| 2002/0123949 A1 | 9/2002 | VanLeeuwen |
| 2002/0143614 A1 | 10/2002 | MacLean et al. |
| 2002/0146018 A1 | 10/2002 | Kailamaki et al. |
| 2002/0147047 A1 | 10/2002 | Letovsky |
| 2002/0151359 A1 | 10/2002 | Rowe |
| 2002/0152116 A1 | 10/2002 | Yan |
| 2002/0160838 A1 | 10/2002 | Kim |
| 2002/0161630 A1 | 10/2002 | Kern et al. |
| 2002/0169021 A1 | 11/2002 | Urie |
| 2002/0169660 A1 | 11/2002 | Taylor et al. |
| 2002/0177479 A1 | 11/2002 | Walker |
| 2002/0194069 A1 | 12/2002 | Thakur et al. |
| 2002/0198043 A1 | 12/2002 | Chowdhury |
| 2003/0003996 A1 | 1/2003 | Nguyen |
| 2003/0004802 A1 | 1/2003 | Callegari |
| 2003/0004808 A1 | 1/2003 | Elhaoussine et al. |
| 2003/0008707 A1 | 1/2003 | Walker et al. |
| 2003/0009379 A1 | 1/2003 | Narasimhan et al. |
| 2003/0013438 A1 | 1/2003 | Darby |
| 2003/0018523 A1 | 1/2003 | Rappaport et al. |
| 2003/0033534 A1 | 2/2003 | Rand |
| 2003/0036425 A1 | 2/2003 | Kaminkow et al. |
| 2003/0040964 A1 | 2/2003 | Lacek |
| 2003/0045353 A1 | 3/2003 | Paulsen |
| 2003/0050831 A1 | 3/2003 | Klayh |
| 2003/0055722 A1 | 3/2003 | Perreault et al. |
| 2003/0055780 A1 | 3/2003 | Hansen et al. |
| 2003/0060264 A1 | 3/2003 | Chilton |
| 2003/0061097 A1 | 3/2003 | Walker |
| 2003/0062242 A1 | 4/2003 | Hallowell et al. |
| 2003/0069787 A1 | 4/2003 | Tendon et al. |
| 2003/0069842 A1 | 4/2003 | Kight et al. |
| 2003/0074311 A1 | 4/2003 | Saylors et al. |
| 2003/0078094 A1 | 4/2003 | Gatto |
| 2003/0083943 A1 | 5/2003 | Adams et al. |
| 2003/0087650 A1 | 5/2003 | Aarnio |
| 2003/0087692 A1 | 5/2003 | Weiss |
| 2003/0101131 A1 | 5/2003 | Warren et al. |
| 2003/0104862 A1 | 6/2003 | Acres |
| 2003/0104865 A1 | 6/2003 | Itkis |
| 2003/0106769 A1 | 6/2003 | Weiss |
| 2003/0115456 A1 | 6/2003 | Kapoor |
| 2003/0130948 A1 | 7/2003 | Algiene et al. |
| 2003/0148807 A1 | 8/2003 | Acres |
| 2003/0149619 A1 | 8/2003 | Stanley et al. |
| 2003/0163425 A1 | 8/2003 | Cannon, Jr. |
| 2003/0182218 A1 | 9/2003 | Blagg |
| 2003/0186747 A1 | 10/2003 | Nguyen |
| 2003/0187762 A1 | 10/2003 | Coyle |
| 2003/0200142 A1 | 10/2003 | Hicks et al. |
| 2003/0200144 A1 | 10/2003 | Antonucci et al. |
| 2003/0208445 A1 | 11/2003 | Compiano |
| 2003/0211883 A1 | 11/2003 | Potts |
| 2003/0216960 A1 | 11/2003 | Postrel |
| 2003/0216967 A1 | 11/2003 | Williams |
| 2003/0228902 A1 | 12/2003 | Walker |
| 2003/0229584 A1 | 12/2003 | Brown |
| 2003/0236704 A1 | 12/2003 | Antonucci |
| 2003/0236749 A1 | 12/2003 | Shergalis |
| 2004/0002369 A1 | 1/2004 | Walker et al. |
| 2004/0006531 A1 | 1/2004 | Kwan |
| 2004/0015438 A1 | 1/2004 | Compiano et al. |
| 2004/0019522 A1 | 1/2004 | Bortolin |
| 2004/0019560 A1 | 1/2004 | Evans et al. |
| 2004/0035923 A1 | 2/2004 | Kahr |
| 2004/0039644 A1 | 2/2004 | Postrel |
| 2004/0039692 A1 | 2/2004 | Shields et al. |
| 2004/0043806 A1 | 3/2004 | Kirby |
| 2004/0048658 A1 | 3/2004 | Sanders |
| 2004/0049439 A1 | 3/2004 | Johnston et al. |
| 2004/0053693 A1 | 3/2004 | An |
| 2004/0068438 A1 | 4/2004 | Mitchell |
| 2004/0078273 A1 | 4/2004 | Loeb et al. |
| 2004/0097287 A1 | 5/2004 | Postrel |
| 2004/0098317 A1 | 5/2004 | Postrel |
| 2004/0107140 A1 | 6/2004 | Postrel |
| 2004/0111346 A1 | 6/2004 | Macbeath |
| 2004/0111366 A1 | 6/2004 | Schneider |
| 2004/0128197 A1 | 7/2004 | Bam |
| 2004/0143500 A1 | 7/2004 | Lopez |
| 2004/0143501 A1 | 7/2004 | Lopez |
| 2004/0158492 A1 | 8/2004 | Lopez |
| 2004/0173673 A1 | 9/2004 | Potts |
| 2004/0186773 A1 | 9/2004 | George et al. |
| 2004/0215505 A1 | 10/2004 | Sullivan |
| 2004/0220854 A1 | 11/2004 | Postrel |
| 2004/0229671 A1 | 11/2004 | Stronach |
| 2004/0262381 A1 | 12/2004 | Mesaros |
| 2005/0015332 A1 | 1/2005 | Chen |
| 2005/0021399 A1 | 1/2005 | Postrel |
| 2005/0021400 A1 | 1/2005 | Postrel |
| 2005/0021401 A1 | 1/2005 | Postrel |
| 2005/0021457 A1 | 1/2005 | Johnson et al. |
| 2005/0043082 A1 | 2/2005 | Peterson |

| | | |
|---|---|---|
| 2005/0060225 A1 | 3/2005 | Postrel |
| 2005/0080727 A1 | 4/2005 | Postrel |
| 2005/0080728 A1 | 4/2005 | Sobek |
| 2005/0096124 A1 | 5/2005 | Stronach |
| 2005/0107155 A1 | 5/2005 | Potts et al. |
| 2005/0137015 A1 | 6/2005 | Rogers |
| 2005/0143174 A1 | 6/2005 | Goldman |
| 2005/0149394 A1 | 7/2005 | Postrel |
| 2005/0177428 A1 | 8/2005 | Ganz |
| 2005/0177519 A1 | 8/2005 | Block |
| 2005/0182693 A1 | 8/2005 | Alivandi |
| 2005/0192864 A1 | 9/2005 | Ganz |
| 2005/0240472 A1 | 10/2005 | Postrel |
| 2005/0250415 A1 | 11/2005 | Barthold |
| 2005/0261056 A1 | 11/2005 | Smolucha |
| 2006/0004629 A1 | 1/2006 | Neemann et al. |
| 2006/0010033 A1 | 1/2006 | Thomas |
| 2006/0020511 A1 | 1/2006 | Postrel |
| 2006/0035692 A1 | 2/2006 | Kirby |
| 2006/0046827 A1 | 3/2006 | Saffari |
| 2006/0052150 A1 | 3/2006 | Hedrick |
| 2006/0063580 A1 | 3/2006 | Nguyen |
| 2006/0079150 A1 | 4/2006 | Filoseta |
| 2006/0100018 A1 | 5/2006 | Ganz |
| 2006/0148559 A1 | 7/2006 | Jordan |
| 2006/0178217 A1 | 8/2006 | Jung |
| 2006/0178899 A1 | 8/2006 | Jung |
| 2006/0178964 A1 | 8/2006 | Jung |
| 2006/0178965 A1 | 8/2006 | Jung |
| 2006/0178966 A1 | 8/2006 | Jung |
| 2006/0178967 A1 | 8/2006 | Jung |
| 2006/0178968 A1 | 8/2006 | Jung |
| 2006/0178970 A1 | 8/2006 | Jung |
| 2006/0178972 A1 | 8/2006 | Jung |
| 2006/0178975 A1 | 8/2006 | Jung |
| 2006/0178985 A1 | 8/2006 | Jung |
| 2006/0195376 A1 | 8/2006 | Jung |
| 2006/0195377 A1 | 8/2006 | Jung |
| 2006/0195378 A1 | 8/2006 | Jung |
| 2006/0195394 A1 | 8/2006 | Jung |
| 2006/0205481 A1 | 9/2006 | Dominelli |
| 2006/0224505 A1 | 10/2006 | Jung |
| 2006/0229976 A1 | 10/2006 | Jung |
| 2006/0253321 A1 | 11/2006 | Heywood |
| 2007/0073582 A1 | 3/2007 | Jung |
| 2007/0087822 A1 | 4/2007 | Van Luchene |
| 2007/0167218 A1 | 7/2007 | Rothschild |
| 2007/0168266 A1 | 7/2007 | Questembert |
| 2007/0239523 A1 | 10/2007 | Yi |
| 2008/0086759 A1 | 4/2008 | Colson |
| 2009/0023490 A1 | 1/2009 | Moshal et al. |
| 2009/0063261 A1 | 3/2009 | Scribner et al. |
| 2010/0174670 A1 | 7/2010 | Walker et al. |
| 2010/0211469 A1 | 8/2010 | Salmon et al. |
| 2010/0227675 A1 | 9/2010 | Luxton et al. |
| 2010/0248823 A1 | 9/2010 | Smith |
| 2011/0151976 A1 | 6/2011 | Holloway |
| 2011/0183749 A1 | 7/2011 | Allen |
| 2011/0207525 A1 | 8/2011 | Allen |
| 2011/0256924 A1 | 10/2011 | McGhie et al. |
| 2011/0275432 A1 | 11/2011 | Lutnick et al. |
| 2012/0041810 A1 | 2/2012 | Hofer |

FOREIGN PATENT DOCUMENTS

| | | |
|---|---|---|
| AU | 2497499 | 11/1999 |
| AU | 2497599 | 11/1999 |
| AU | 199924973 | 11/1999 |
| AU | 199924974 | 11/1999 |
| AU | 199924975 | 11/1999 |
| AU | 3018500 | 11/2000 |
| AU | 200030185 | 11/2000 |
| AU | 2003200145 A1 | 8/2003 |
| AU | 2004250640 A1 | 12/2004 |
| EP | 0308224 | 3/1989 |
| EP | 0525363 | 2/1993 |
| EP | 0949596 | 10/1999 |
| EP | 1014320 A1 | 6/2000 |
| EP | 1107196 | 6/2001 |
| EP | 1141876 A1 | 10/2001 |
| EP | 1351180 A2 | 10/2003 |
| EP | 1399897 | 3/2004 |
| EP | 1330729 A4 | 11/2005 |
| EP | 1598762 A1 | 11/2005 |
| EP | 1746550 A2 | 1/2007 |
| EP | 1787250 A2 | 5/2007 |
| GB | 2319381 | 5/1998 |
| GB | 2333879 | 8/1999 |
| GB | 2380687 | 4/2003 |
| JP | 8235276 | 9/1996 |
| JP | 2003132224 | 5/2003 |
| WO | WO9215174 A1 | 3/1992 |
| WO | 9323817 | 11/1993 |
| WO | 9416781 | 8/1994 |
| WO | 9503570 A2 | 2/1995 |
| WO | 9713228 | 4/1997 |
| WO | 9748078 | 12/1997 |
| WO | 9926176 | 5/1999 |
| WO | 9930256 | 6/1999 |
| WO | 9952051 | 10/1999 |
| WO | 9960503 | 11/1999 |
| WO | 0014665 | 3/2000 |
| WO | 0031658 | 6/2000 |
| WO | 0033159 | 6/2000 |
| WO | 0033222 | 6/2000 |
| WO | 0038088 A1 | 6/2000 |
| WO | 0079461 | 12/2000 |
| WO | 0101282 | 1/2001 |
| WO | 0152078 | 7/2001 |
| WO | 0157617 | 8/2001 |
| WO | 0164306 | 9/2001 |
| WO | 02041556 A3 | 5/2002 |
| WO | 02077884 A2 | 10/2002 |
| WO | 03083730 A2 | 10/2003 |
| WO | 2004019257 A1 | 3/2004 |
| WO | WO2005006113 | 1/2005 |
| WO | 2005082480 | 9/2005 |
| WO | 2006020413 | 2/2006 |
| WO | 2006022593 A1 | 3/2006 |
| WO | 2009070889 A1 | 6/2009 |
| WO | 2009094395 | 7/2009 |

OTHER PUBLICATIONS

"Amazon.com and Netflix.com Establish Promotional Relationship for the Sale and Rental of DVD Titles" Business Wire Dec. 4, 1998, 3 pp.
Brook, Valerie. "GM turns up the heat with plan to cross-sell some financial products." Nov. 18, 1994 http://www.americanbanker.com/issues/159_150/-49630-1.html?zkPrintable=true.
"Beneficial, Casual Male Team Up on Card", American Banker. May 4, 1998. . http://www.americanbanker.com.
"E-Centives," (http://www.emaginet.com/de...memfaq.shtml), download date: May 23, 1999, 3 pp.
Bloom, Jennifer Kingson. "Wal-Mart on Retail Road Less Traveled: Cobranding," The American Banker Sep. 11, 1998, 3 pp.
Elkin, Tobi "Promotions: Mastercard Wins Coveted On-Pack Real Estate in Tie-in with Microsoft" Brandweek Sep. 14, 1998, 1 page.
"Microsoft and First USA Announces $90 Million Online Advertising Alliance" EDP Weekly's IT Monitor Nov. 2, 1998 2 pp.
Feldman, Amy "Paying with Plastic Not Such a Smart Idea", New York Daily News Nov. 4, 1998, 2 pp.
Cowell, Alan "America's Turn to Colonize; Creditcard Issuers Invade Britain, with U.S. Firepower", The New York Times Nov. 12, 1998, 5 pp.
Armstrong, Larry, "The Free-PC Game: Lure 'Em in and Lock 'Em Up," Business Week, Information Technology, Jul. 19, 1999, 1 pg.
"Shoppers Charge Accounts Co. to Administer Private Label Credit Card for Lew Magram LTD; Program Marks SCA,s Entry into Retail Catalog/Mail Order Industry" PR Newswire Jun. 29, 1998, 6 pp.
"About Click Rewards." Wired Magazine. http://www.wired.com/wired/subscribe/clickmiles.html.
Souccar, Miriam K. "Epidemic of Rate Shopping Spurs a Search for remedies," Jan. 7, 1999, Copyright 1999 American Banker, Inc.
"Wellsparks Group Launches V.I.P. Rewards; The Most Comprehensive Relationship Marketing Program Ever Created by a Mall Developer", Business wire May 19, 1998, 2 pp.

"Jay Jacobs Inc. Introduces Private Label Credit Card", Business Wire May 18, 1998, 1 page.
Meece, Mickey "Big Finance Companies May Want Piece of Limited's Private-Label Card Program", The American Banker Apr. 12, 1995, 2 pp.
"Points Earn Little Credit as Cardholders Fail to Cash in" Birmingham Post May 9, 1998, 2 pp.
"Card Briefs: Beneficial, Casual Male Team Up on Card" The American Banker May 4, 1998 1 pg.
AAdvantage Auction "Experience More with You AAdvantage Miles". http://www.aa.com/il8n/urls/auction.jsp?anchorLocation=DirectURL&title=auction.
Wald, Matthew L. "Spending It; Untying Cellular Phones From Those Annual Contracts" The New York Times Mar. 15, 1998, 2 pp.
Wijnen, Renee "Cendant Eyes Cross-Marketing Opportunities; CUC International-HFS Inc. Merger Expected to Yield an Additional 2 Million Club Members" DM News Feb. 2, 1998, 2 pp.
Sanders, Edmund "Tricky Business; The Magic of Rebate Cards can Quickly Disappear", Chicago Tribune Aug. 18, 1997, 3 pp.
Simon, Ruth "Make Sure Your Rebate Card Still Delivers the Goods", Money Aug. 1997, 2 pp.
Selasky, Susan "Easy-To-Swallow Savings; Diner Credit Cards Serve Wide menu of Discounts", Pittsburgh Post-Gazette Dec. 5, 1996, 3 pp.
"Chemical Bank and AT&T Smart Cards form Strategic Alliance", www.att.com/press/1193/931117.blb.html, 3 pp.
Kristof, Kathy "Card Sharks are in Season; be Wary of Discounts and Rebates as You Shop Around for Good Credit Deals", Chicago Tribune, Nov. 23, 1993, 2 pp.
Wessel, Harry "Rewarding Experience?; Credit Cards Offering Bonuses Not for Everyone", Chicago Poet-Gazette Dec. 5, 1996, 3 pp.
Ross, Chuck et al., "Coke Card promotion set for '98", (http //adage com/news.sub.--and.sub.--features/features/19971117/article3 html), Copyright Nov. 1997, 2 pp.
Singletary, Michelle, "Electronic World, Unchecked Problem?", The Washington Post, Mar. 4, 1997, Section: Financial, p. C01, 4 pp.
Ellin, Abby, "Listening to an Earful for Savings," (Hear the Pitches and talk for Free), The New York Times, Jan. 24, 1999, 1 pg.
Cox, Beth, "Visa, Travelweb Enter Online Marketing Partnership," Internetnews.com, Jan. 21, 1999, 1 pg.
Tedesco, Richard. "Pactel Pushes Net Access." Broadcasting & Cable. Jun. 3, 1996, pp. 64-65.
Colman, Price. "Cross-marketing Cuts Cable Bills." Broadcasting & Cable. Jul. 15, 1996, p. 44, 2 pp.
O'Brien, Timothy L., "The Market: Market Place—Taking the Danger out of Danger out of Risk; Chase says Models Helped it avoid Financial Minefields," The New York Times Business/Financial Desk, Jan. 20, 1999 Section C. Column 2 at p. 1, 4 pp.
"Rent from NetFlix.com Buy from Amazon.com," Official Press Release, Jan. 17, 1999, 1 pg.
"Let's Play the Cash Register Receipts Lottery", The New York Times, Dec. 25, 1990, Section: Section 1, p. 30, col. 4, Editorial Desk, 1 pg.
Dennis, Sylvia. "Visa Gets ready for Interactive Set-Top Boxes," Newsbytes, Dec. 14, 1998, 2 pp.
"Philips offers customers financing through Citicorp; Philips Medical Systems North America, Citicorp North America Inc." Health Industry Today, Jun. 1991, Section: vol. 54, No. 6, p. 4, ISSN: 0745-4678, 1 page.
Sinclair, Stewart. "To Mail or Not to Mail?" Strategy, Strategy Directresponse Special Report, Couponing, Oct. 12, 1998 at p. D21, 4 pp.
"Winn-Dixie/The Salvation Army Report Contributions for War Against Hunger", PR Newswire, Jun. 10, 1993, Section: Financial News, 1 pg.
Armstrong, Larry. "Coupon Clippers, save Your Scissors," Vons Supermarkets are Revolutionizing the Delivery of Discounts. Business week, Jun. 20, 1994, No. 3377 at p. 164, 2 pp.
Patch, Kimberly, "Sled InterNIC Debut Internet Services; Sled Corp Offers Electronic Coupons for Encryption software; InteNIC Information Services Launches InfoGuide to Internet Computer Network" PC Week, May 16, 1994 vol. 11 No. 19 at p. 130, ISSN: 0740-1604, 1 page.
"American Eagle Outfitters" PR Newswire. Mar. 26, 2010. www.printthis.clickability.com/pt/cpt?expire=&title=American+Eagle+Outfitters%2C+Inc.+Introduces+the . . . .
Andreoli, Tom et al., "Cash Machines Offer a Whole Lotto Money . . . ", Crain's Chicago Business, Jun. 19, 1995, Section: News, p. 8, 2 pp.
Brochure: "MyPoints (R)", MotivationNet, Inc. (TM), Homepage: www.mypoints.com, Copyright: Apr. 1998, 29 pp.
Bonnici, Joseph et al., "Consumer issues in coupon usage: An exploratory analysis", Journal of Applied Business Research, winter 1996/1997, vol. 13, No. 1, pp. 31-40, ISSNn: 0892-7626, CODEN: JPBEBK, 11 pp.
Hoeschen, Brad. "Brookfield Square Hopes Mall Card Strikes a Chord," Business Journal-Milwaukee, vol. 14, No. 50, p. 19, Sep. 12, 1997, 2 pp.
Armstrong, Larry. "The Free-PC Game: Lure 'EM In and Lock 'Em Up". Jul. 19, 1999 http://www.businessweek.com/1999/99__29/b3638169.htm?scriptFramed.
Iverson, Mark. "DataCard Partners With CSI to Offer Card-Based Loyalty Solution to Merchants." Jul. 19, 1998 http://www.thefreelibrary.com/_/print/PrintArticle.aspx?id=20883274.
Notice of Allowance; U.S. Appl. No. 13/441,365; Mailing Date Jun. 16, 2012.
Non Final Rejection dated May 4, 2012; U.S. Appl. No. 13/428,656; pp. 1-6.
Notice of Allowance; U.S. Appl. No. 13/428,656; Mailing Date May 15, 2012.
Non Final Rejection dated Mar. 6, 2012; U.S. Appl. No. 13/359,120; pp. 1-7.
Notice of Allowance; U.S. Appl. No. 13/359,120; Mailing Date Apr. 18, 2012.
Non Final Rejection dated Mar. 12, 2012; U.S. Appl. No. 13/359,104; pp. 1-8.
Notice of Allowance; U.S. Appl. No. 13/359,104; Mailing Date Apr. 13, 2012.
Non Final Rejection dated Mar. 6, 2012; U.S. Appl. No. 13/359,080; pp. 1-11.
Notice of Allowance; U.S. Appl. No. 13/359,080; Mailing date Apr. 11, 2012.
Non Final Rejection dated Jan. 10, 2012; U.S. Appl. No. 12/759,506; pp. 1-10.
Notice of Allowance; U.S. Appl. No. 12/759,506; Mail date Mar. 5, 2012.
Non Final Rejection dated Dec. 15, 2012; U.S. Appl. No. 12/720,743; pp. 1-10.
Notice of Allowance; U.S. Appl. No. 12/720,743; Mailing date Jan. 24, 2012.
Non Final Rejection dated May 12, 2009; U.S. Appl. No. 11/420,255; pp. 1-7.
Notice of Allowance; U.S. Appl. No. 11/420,255; Mailing Date Dec. 16, 2009.
Non Final Rejection dated Sep. 24, 2012; U.S. Appl. No. 13/542,451; pp. 1-6.
Notice of Allowance; U.S. Appl. No. 13/542,451; Mailing Date Nov. 5, 2012.
Non Final Rejection dated Sep. 7, 2012; U.S. Appl. No. 13/532,342; pp. 1-6.
Notice of Allowance; U.S. Appl. No. 13/532,342; Mailing Date Sep. 24, 2012.
Non Final Rejection dated Sep. 6, 2012; U.S. Appl. No. 13/531,904; pp. 1-6.
Notice of Allowance; U.S. Appl. No. 13/531,904; Mailing Date Sep. 19, 2012.
Non Final Rejection dated Jul. 17, 2012; U.S. Appl. No. 13/479,417; pp. 1-11.
Notice of Allowance; U.S. Appl. No. 13/479,417; Mailing Date Jul. 30, 2012.
Notice of Allowance; U.S. Appl. No. 13/441,365; Mailing Date Jun. 18, 2012.

"Cardbriefs: Stored-Value Card Designed for Casinos", The American Banker, Oct. 31, 1995, Section: Credit/Debit/ATMS, 1 pg.
"Tecmark Reward Terminal", (http //www tecmarkinc com/terminal htm), copyright, 1996 Tecmark Services, Inc., 1 pg.
WAP WTLS: Wireless Application Protocol Wireless Transport Layer Security Specification, Wireless Applications Forum, Limited, Apr. 30, 1998. [Retrieved on Jan. 19, 2009]. Retrieved from the Internet <Oct. 7, 2008>.
"Fallon: UK Retailers Loyal Customer 'Card Wars' Prove costly (Most major retailers in the UK have grown their sales over the past 2 years by lunching loyalty-card program"; Supermarket News, May 5, 1997; vol. 47, No. 18, p. 57.
Booker, Ellis, "Checkout lines to offer more than just candy and waiting", Computer World, May 21, 1990, 1 pg.
Fickenscher, Lisa, "Merchant: American Express Seeks to Mine Its Data on Cardholder Spending Patters", The American Banker, Mar. 24, 1997, Credit/Debit/ATMS, 2 pp.
Fickenscher, Lisa, "Amex to Start Free Rewards Program with Discounts on Merchandise", The American Banker, Oct. 18, 1996, Section: Credit/Debit/ATMS, p. 10, 2 pp.
Fitzgerald, Kate, "Amex program moves loyalty to next level: Custom Extras finds a medium customers can't ignore: Billing Statements", Advertising Age, Nov. 4, 1996, Section: News, 2 pp.
Amato-McCoy, Deena, "Co-Branded Acme Credit Card Rewards Loyal Users" Supermarket News, Jun. 15, 1998, Section: p. 17, ISSN: 0039-5803, 2 pp. "DataCard Partners With CSI to Offer Card-Based Loyalty Solution to Merchants", Business Wire, Jul. 9, 1998, 1 pg.
Albright, Mark, "Grocery savings via Web coupons", St. Petersburg Times, Jul. 22, 1998, Section: Business, 2 pp.
Joan Magretta—"Why Business Models Matter" Harvard Business Review—May 2002 pp. 1-8.
A. Parasuraman, Dhruv Grewal The Impact of Technology on the Quality-Value_Loyalty Chain: A Research Agenda; University of Miami—Journal of the Academy of Marketing Science; vol. 28, No. 1. pp. 168-174.
Byron Sharp & Anne Sharp "Loyalty Programs and their Impact on Repeat-Purchase Loyalty Patterns: a replication and extension"—Marketing Science Centre; University of South Australia—pp. 1-18.
David S. Evans "Some Empirical Aspects of Multi-sided Platform Industries"—NERA Economic Consulting; Review of network Economics; vol. 2 Issue 3—Sep. 2003; pp. 191-209.

Uncles et. al. "Customer Loyalty and Customer Loyalty programs"—Journal of Consumer Marketing, vol. 20; No. 4 pp. 294-316.
Dennis L. Duffy—"Customer Loyalty Strategies"—Journal of Consumer Marketing, vol. 15; No. 5 1998; pp. 435-448.
Louise O'Brien & Charles Jones—"Do Rewards Really Creat Loyalty"?—Harvard Business Review; May-Jun. 1995; pp. 73-83.
Frederick F. Reichheld & Phil Schefter—"E-Loyalty—Your secret Weapon on the Web"—Harvard Business Review; Jul.-Aug. 2000; pp. 105-113.
Molly Plozay & Julie Bohn—"How Merchant-Funded Rewards Give new Life to Customer Loyalty programs"—First Data; Oct. 2008; firstdata.com—pp. 1-10.
MilePoint.com—Turning Miles into Money; Internet Archieve—WayBack Machines; web.archieve.org/web/20010801155716/http://www.milepoint.com/about.faq.asp; pp. 1-5.
Rajiv Lal—"Harrah's Entertainment Inc."—Harvard Business School; 9-502-011; Rev. Jun. 14, 2004; pp. 1-27.
Avery Johnson—"Hotels Take 'Know Your Customer to New Level"—The Wall Street Journal—Feb. 7, 2006; p. D1.
Anthony T.H.Chin—"Impact of Frequent Flyer Programs on the Demand for Air Travel"—Department of Economics; National University of Singapore; Journal of Air Transportation; vol. 7, No. 2—2002; pp. 53-86.
Frederick F. Reichheld—"Loyalty-Based Management"—Harvard Business Review; Mar.-Apr. 1993; pp. 63-74.
Points.com—"Get More Rewards, Faster"—Internet Archieve WayBack Machine; May 24, 2005.
points.com—Stuff It!—Stuff that stocking with a JCPenny Gift Certificate. She'll be happy to spend it.; Internet Archieve WayBack Machine; Dec. 10, 2005.
Peter Jin Hong, creative director at Tribal DDB in Vancouver—"Digital Eye".
Kumar et al. "Sales Promotions on the Internet"—USENIX Technical Program—Paper—Proceedings of the 3rd USENIX Workshop on Electronic Commerce, 1998; pp. 167-176; static.usenix.org/event/ef98/full_papers/kumar_promotions/kumar_html/kumar.html.
Christina Binkley—"Taking Retailers' Cues, Harrah's Taps into Science of Gambling"—The Wall Street Journal; Nov. 22, 2004—p. A1.
Werner Reinartz and V. Kumar—"The Mismanagement of Customer Loyalty"—Harvard Business Review; Jul. 2002 pp. 2-12.
points.com—exchange points. reward yourself. ; Internet Archieve WayBack Machine; Oct. 26, 2004.

GRAPHICAL USER INTERFACE FOR THE CONVERSION OF LOYALTY POINTS FOR SERVICES

CROSS-REFERENCE TO RELATED APPLICATIONS

This application is a continuation of U.S. application Ser. No. 13/532,342 now issued U.S. Pat. No. 8,297,502 titled "User Interface For the Exchange of Non-Negotiable Credits For Entity Independent Funds", which was a continuation of U.S. Pat. No. 7,703,673, which was filed on May 25, 2006. U.S. Pat. Nos. 8,297,502 and 7,703,673 have been issued and are not presently pending.

Our claim to the priority date is through pending U.S. Application Ser. No. 13/681,479 and U.S. application Ser. No. 13/681,493, which are continuation-in-part applications that claim the benefit of U.S. Pat. No. 8,342,399 and U.S. Pat. No. 8,376,224, which were pending at the time of filing this application.

U.S. Pat. No. 8,376,224 is a continuation-in-part application claiming the benefit of U.S. Pat. Nos. 7,703,673; 8,123,127; and 8,162,209, which were pending at the time of the filing of this patent.

U.S. Pat. No. 8,342,399 is a continuation-in-part application claiming the benefit of U.S. Pat. Nos. 7,703,673; 8,123,127; and 8,162,209, which were pending at the time of the filing of this patent.

Thus, there is a continuous chain of active pending U.S. cases from the co-pending applications back to U.S. Pat. No. 7,703,673, which was filed on May 25, 2006, which the present case is a continuation of—hence claiming the benefit of priority to this case (U.S. Pat. No. 7,703,673) is proper.

BACKGROUND

The present disclosure relates to the field of graphical user interfaces for exchanging non-negotiable credits for entity independent funds.

Entities often reward consumers for utilizing their services with non-negotiable credits, such as frequent flier miles, consumer loyalty points, and entertainment credits. These non-negotiable credits can be applied towards products and/or services provided by a granting entity or its affiliates. For example, consumers can apply frequent flyer credits towards the purchase of airline tickets or airline upgrades. In another example, a consumer can utilize purchase points from a credit card company to receive percentage discounts on goods provided by affiliates. In still another example, entertainment credits can be redeemed for prizes offered in a winnings storefront of an entertainment site.

Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective. For instance, airlines often limit the choice of travel dates, known as black-out dates, to which frequent flyer credits can be applied.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. For instance, consumers participating in online entertainment sites often are required to wait a minimum of three days for their entertainment credits to be redeemed. Redemption delay can be particularly aggravating to e-commerce consumers, who by nature of an e-commerce marketplace expect rapid responses and immediate consumer gratification.

Time can also be a factor for redeeming credits having an associated expiration date. A consumer's non-negotiable credits may expire before a sufficient quantity is acquired for a desired purchase. Lesser purchases requiring fewer credits may not have a significant appeal for the consumer. Hence, credit expiration dates can further decrease the consumer value of non-negotiable credits.

Yet another problem with conventional implementation of non-negotiable credits is that consumers often belong to multiple credit-earning programs that provide the consumers with multiple incompatible forms of non-negotiable credit. Each of these multiple programs can span a single industry or can span multiple industries. For example, a consumer can acquire a moderate number of frequent flyer miles with multiple airlines, where each airline specific account contains insufficient credits to have any meaningful consumer value. Consumers can also have many different types of non-negotiable credits, such as multiple merchant specific credit, credit card credits, and frequent flier miles, each having different redemption values and program redemption rules. These different programs, values, and rules can understandably confuse and frustrate consumers, who due to their confusion, often elect to avoid participating in an entity sponsored credit program.

DETAILED DESCRIPTION

Figure 1:
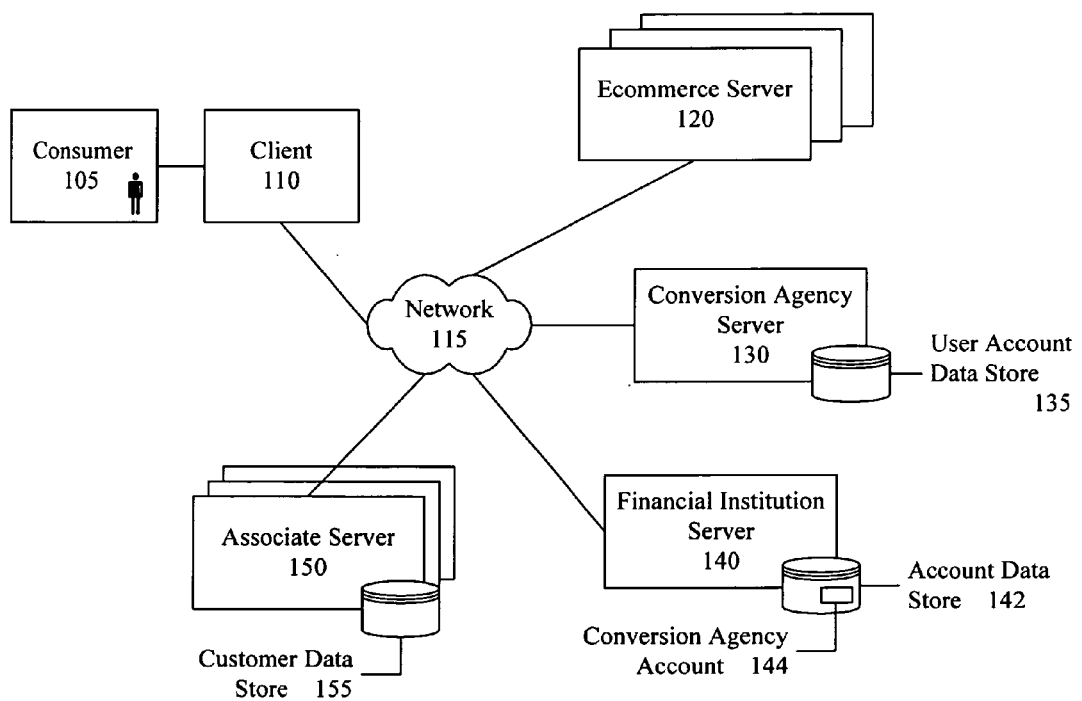
FIG. 1 is a schematic diagram of a Web based conversion of non-negotiable credits associated with an entity to entity independent funds system in accordance with an embodiment of the inventive arrangements disclosed herein.

The present disclosure permits consumers to transform non-negotiable credits provided by an entity to negotiable funds in an approximately immediate fashion using the Web. More specifically, a conversion agency can function as an intermediary that converts entity provided credits into entity independent funds. The conversion agency can be an independent entity that is not directly affiliated with the credit providing entities.

The conversion can occur automatically using a Web initiated action and can have approximately immediate results. Approximately immediate as used herein can signify that a transaction can occur within a single Web session with user acceptable delay tolerances, typically under half an hour and often under a few minutes. In one embodiment, credits can be automatically converted to funds as part of an e-commerce checkout. In another embodiment, credits can be converted into a user accessible account held with a financial institution.

The present disclosure can be implemented in accordance with numerous aspects consistent with material presented herein. For example, one aspect of the present disclosure can include a method for converting credits to funds. The method can include a step of a Web site receiving user identification information. Non-negotiable credits can be identified that are associated with an entity with which the user has previously interacted. The previous interactions could have earned the non-negotiable credits. Responsive to a user request, a conversion agency can convert a quantity of the non-negotiable credits into a quantity of negotiable funds. The conversion agency can be an agency not directly associated with the entity. The user can be permitted to access the quantity of negotiable funds. The quantity of negotiable funds can be applied to user specified purchases. At least a portion of the purchases can involve at least one vender that does not honor the non-negotiable credits.

Another aspect of the present disclosure can include a software method for converting non-negotiable credits into negotiable funds. The method can receive a user request to convert a quantity of non-negotiable credits held in a user account associated with an entity. A conversion rate between the non-negotiable credits available to the user and a form of negotiable funds can be automatically determined. A quantity of non-negotiable credits can be automatically subtracted from the user account. A quantity of the negotiable funds based upon the determined conversion rate and quantity of subtracted funds can be automatically transferred to a financial account. The financial account can be an account that is not associated with the entity. The entire method can occur in an approximately immediate fashion.

Still another aspect of the present disclosure can include a Web-based credit to fund conversion system. The system can include a non-negotiable credit account, a negotiable funds account, and a conversion agency. The non-negotiable credit account can be associated with an entity. Non-negotiable credits contained within the non-negotiable credit account can be earned though previous interactions between a user and the entity. The negotiable funds account can include negotiable funds that the user is able to apply to user specified e-commerce purchases. One or more venders involved in the e-commerce purchases can be venders that do not honor the non-negotiable credits for the e-commerce purchases. The conversion agency can automatically and approximately immediately convert a quantity of credits from the non-negotiable credit account to a quantity of funds in the negotiable funds account responsive to a request from the user.

It should be noted that various aspects of the disclosure can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

FIG. 1 is a schematic diagram of a Web based conversion of non-negotiable credits associated with an entity to entity independent funds system 100 in accordance with an embodiment of the inventive arrangements disclosed herein. System 100 includes consumer 105 and conversion agency server 130.

Consumer 105 interacts with conversion agency server 130 via client 110. Client 110 can be any of a variety of interfaces including, but not limited to, another human being, a personal computer, a kiosk, a graphical user interface (GUI), a Web page, a telephone, a personal data assistant (PDA), a mobile phone, and the like.

Client 110 can operate in a stand-alone fashion. Alternatively, client 110 can be a device that cooperatively participates in a network of distributed computing devices. Client 110 can also be another human being utilizing an alternate form of Client 110 to access conversion agency server 130 via network 115. Network 115 can facilitate data exchanges over wireless as well as line-based communication pathways and protocols.

Both consumer 105 and conversion agency server 130 can interact with associate server 150, e-commerce server 120, and financial institution server 140 via network 115. Conversion agency server 130 includes user account data store 135 in which consumer 105 is a member. Associate server 150 includes customer data store 155 in which consumer 105 is a member. Financial institution server 140 includes account data store 142. Account data store 142 includes conversion agency account 144 corresponding to conversion agency 130.

Consumer 105 earns non-negotiable credits from associate server 150. The quantity of these non-negotiable credits is saved in customer data store 155. The method in which consumer 105 earns credits can be any of a variety of activities including, but not limited to, making online purchases, making in-store purchases, playing online games, participating in online games of chance, participating in surveys, and the like. Consumer 105 uses conversion agency server 130 to convert the non-negotiable credits from associate server 150 into negotiable funds provided by e-commerce server 120 or financial institution 140. In one embodiment, conversion agency 130 can include multiple reward accounts of consumer 105.

For example, consumer 105 earns five hundred credits from participating in an online game of chance hosted by associate server 150. Consumer 105 can choose to use conversion agency 130 to convert any or all of these credits to a monetary equivalent. Conversion agency 130 withdraws the necessary amount from conversion agency account 144 contained within the account data store 142 of financial institution 140 and transfers it to an account specified by consumer 105. In another example, consumer 105 uses conversion agency 130 to complete a purchase at e-commerce server 120. Again, conversion agency 130 withdraws the necessary amount from conversion agency account 144 contained within the account data store 142 of financial institution 140 and transfers it to the account of e-commerce server 120.

E-commerce server 120 can be any Web site that supports online purchases of goods or services. In one embodiment, e-commerce server 120 can include a distinct payment option for conversion agency 130. This distinct payment option could process the conversion of credits through their Web site. Alternatively, the distinct payment option could launch an application to process the conversion of credit that is separate from their Web site. In another embodiment, associate server 150 can act as e-commerce server 120.

Financial institution server 140 can be any of a variety of entities including, but not limited to, a bank, a credit card company, an investment firm, and the like. In one embodiment, financial institution server 140 can reside in the same country as consumer 105 and/or associate server 150. In another embodiment, financial institution server 140 can reside in a country other than that of consumer 105 and/or associate server 150.

Figure 2:
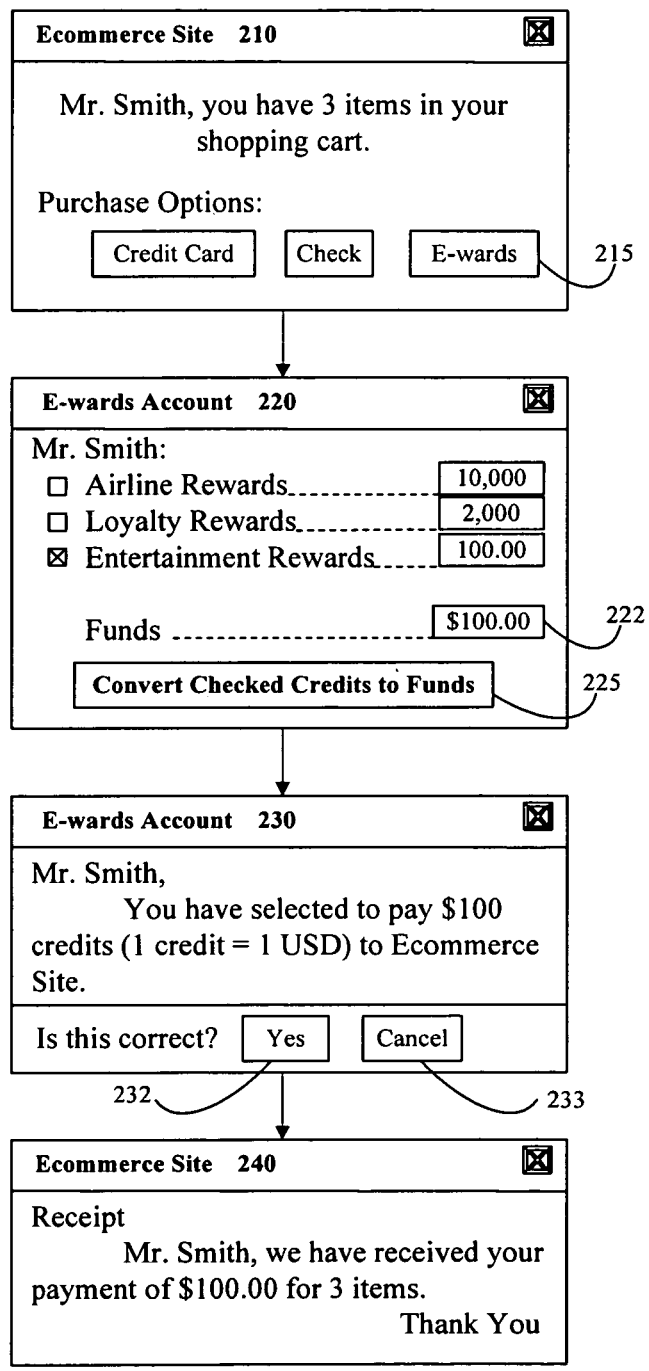
FIG. 2 is a schematic diagram of successive GUIs that illustrate the Web based conversion of non-negotiable credits associated with an entity to entity independent funds system in accordance with an embodiment of the inventive arrangements disclosed herein.

FIG. 2 is a schematic diagram of successive GUIs that illustrate the Web based conversion of non-negotiable credits associated with an entity to entity independent funds system 200 in accordance with an embodiment of the inventive arrangements disclosed herein.

GUI 210 can be a checkout window from any e-commerce site. GUI 210 includes payment button 215. Payment button 215 can represent a payment option that includes the conversion of non-negotiable credits to purchase the items in the shopping cart. Selection of payment button 215 by a user can produce GUI 220.

GUI 220 can be a display window from a conversion agency. GUI 220 includes display box 222 and button 225. GUI 220 can be rendered by any of a variety of means including, but not limited to, a Web browser, a JAVA applet, a PERL script, and the like. In one embodiment, GUI 220 can be contained within the e-commerce site. GUI 220 can display the balance of non-negotiable credits from one or more reward programs. GUI 220 contains a means by which the user selects the type of non-negotiable credits to convert including, but not limited to, a set of radio buttons, a set of checkboxes, a highlighting mechanism, and the like. Display box 222 can display the monetary value of the selected non-negotiable credits. The value displayed in display box 222 can be based on preset conversion factors. Button 225 can represent the initiation of the process by which the selected non-negotiable credits are converted to negotiable funds. Selection of button 225 by a user can produce GUI 230.

GUI 230 can be a display window from a conversion agency. GUI 230 includes yes button 232 and cancel button 233. GUI 230 can be rendered by any of a variety of means including, but not limited to, a Web browser, a JAVA applet, a PERL script, and the like. In one embodiment, GUI 230 can be contained within the e-commerce site. GUI 230 can display a summary message of the transaction initiated by GUI 220. GUI 230 can include a means to continue the transaction, yes button 232, and a means to cancel the transaction, cancel button 233. Selection of cancel button 233 by a user cancels the transaction and can return the user to GUI 220. Selection of yes button 232 by a user completes the transaction initiated in GUI 220 and can produce GUI 240.

GUI 240 can be a display window from the same said e-commerce site. GUI 240 can contain a message acknowledging the successful conversion of the user's non-negotiable credits into negotiable funds for the purchase of the items in the shopping cart.

Figure 3:
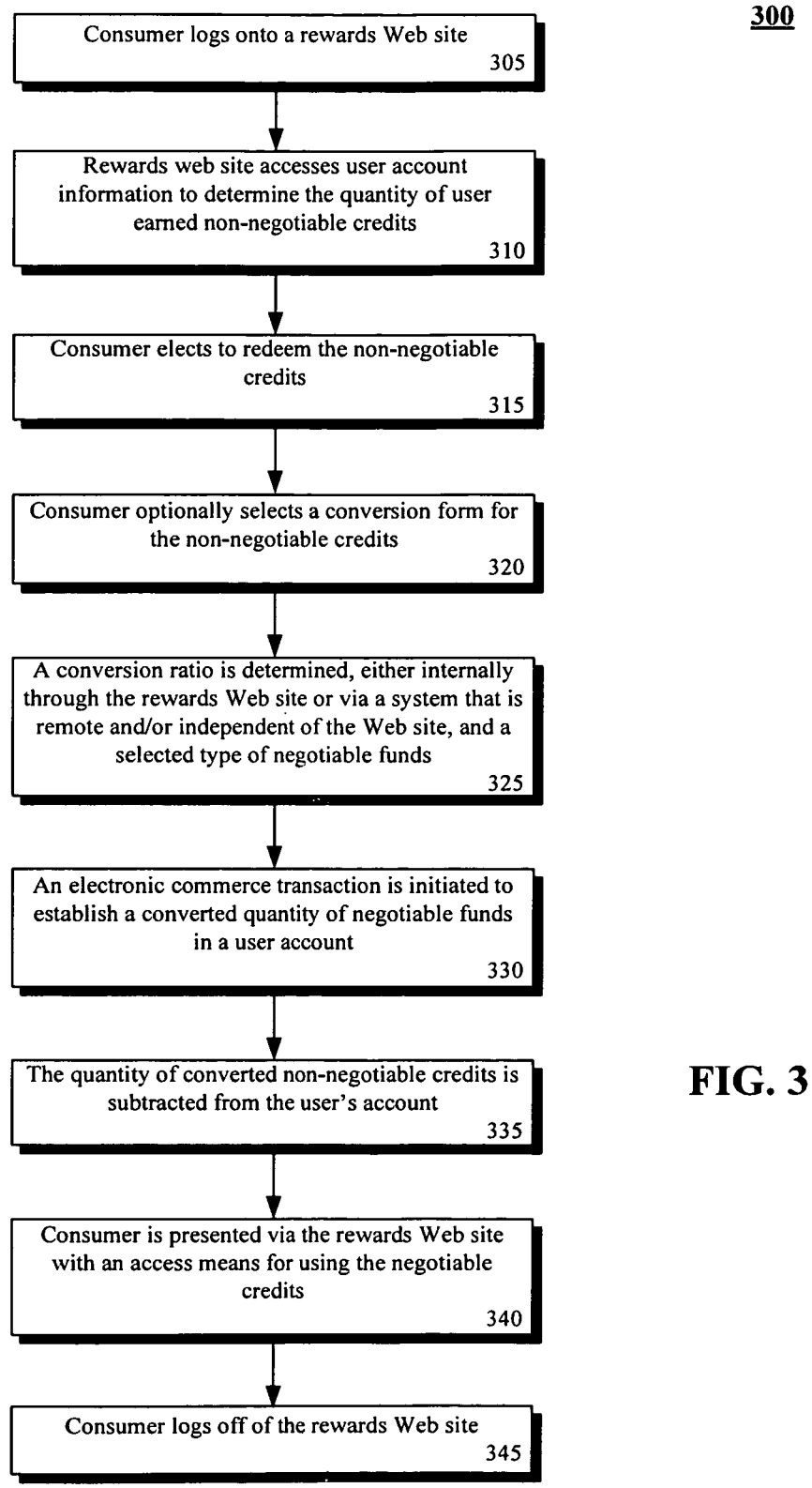
FIG. 3 is a flow chart of a method for the Web based conversion of non-negotiable credits associated with an entity to entity independent funds system in accordance with an embodiment of the inventive arrangements disclosed herein.

FIG. 3 is a flow chart of a method 300 for the Web based conversion of non-negotiable credits associated with an entity to entity independent funds system in accordance with an embodiment of the inventive arrangements disclosed herein.

Method 300 can begin in step 305, where a consumer logs onto a rewards Web site. In step 310, the rewards Web site utilizes the user information provided in step 305 to access the consumer's account information and display the amount of non-negotiable credits in the consumer's account. The consumer elects to redeem some quantity of non-negotiable credits in step 315. If supported by the rewards Web site, step 320 can occur in which the consumer can select the form of negotiable funds to convert the non-negotiable credits. In step 325, a ratio is determined for the conversion of the non-negotiable credits to the selected type of negotiable funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 330 to establish the converted amount of negotiable funds in a user account. The quantity of converted non-negotiable credits is subtracted from the user's account in step 335. In step 340, the rewards Web site presents the consumer with an access means for the negotiable funds. Lastly, the consumer terminates the session by logging off the rewards Web site in step 345.

The present disclosure may be realized in hardware, software, or a combination of hardware and software. The present disclosure may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present disclosure also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This disclosure may be embodied in other forms without departing from the spirit or essential attributes thereof. Accordingly, reference should be made to the following claims, rather than to the foregoing specification, as indicating the scope of the disclosure.

What is claimed is:

1. A method comprising:
a computer serving a set of one or more Web pages for a loyalty program of an entity to one or more remotely located client machines, wherein the Web pages are able to be rendered within a client-side browser as a graphical user interface on the one or more client machines, wherein upon being rendered within the client-side browser said graphical user interface shows a quantity of non-negotiable credits, wherein said non-negotiable credits are loyalty points of the loyalty program possessed by a member, wherein the loyalty points are maintained in a loyalty program account owned or controlled by the entity, wherein the entity redeems the loyalty points for a set of entity services that the entity provides to the member, wherein upon being rendered within the client-side browser the graphical user interface comprises a conversion option to convert at least a subset of the shown non-negotiable credits into a quantity entity independent funds, wherein said entity independent funds are different loyalty points of a different loyalty program of a commerce partner, wherein the different loyalty points are redeemable by the commerce partner for commerce partner services that the commerce partner provides to the member, wherein said entity independent funds are possessed by the member and are maintained in a funds account, wherein the funds account is neither owned or controlled by the entity or by any subsidiary or parent of the entity, wherein the entity does not accept the entity independent funds as payment for any of the entity services, wherein an agreement exists between the entity and the commerce partner, wherein the agreement permits members to convert the non-negotiable credits to the entity independent funds, wherein the agreement specifies that the entity is to compensate the commerce partner in an agreed upon amount of cash or credit for conversions of non-negotiable credits to entity independent funds;

the computer responsive to receiving a message indicating a selection of the conversion option, processing the selection to effectuate changes in the served set of Web pages; and responsive to the processing, the computer serving one or more Web pages or Web page updates that include the effectuated changes to the one or more remotely located client machines, wherein upon being rendered within the client-side browser the graphical user interface is updated with the effectuated changes, wherein the updated graphical user interface shows a reduced quantity of non-negotiable credits possessed by the member in the loyalty program, said reduced quantity resulting at least in part from the subset of non-negotiable credits being converted into the quantity of entity independent funds.

2. The method of claim 1, wherein the entity services provided by the entity for which the non-negotiable credits are redeemable with the entity comprise at least one of:
   travel services for an airlines,
   travel services for a train,
   travel services for a cruise ship,
   vehicle rental services for a vehicle, or
   lodging services for lodging the member,
wherein the commerce partner services provided by the commerce partner for which the entity independent funds are redeemable with the commerce partner comprise at least one of:
   travel services for an airlines,
   travel services for a train,
   travel services for a cruise ship,
   vehicle rental services for a vehicle, or
   lodging services for lodging the member.

3. The method of claim 1, wherein the Web pages do not permit the member to redeem the entity independent funds, wherein redeeming the entity independent funds occurs through a set of Web pages not owned or controlled by the entity and not owned or controlled by any subsidiary or parent of the entity.

4. The method of claim 1, wherein the entity charges the member a fee for converting the non-negotiable credits to the entity independent funds, wherein the fee is specified in terms-of-use of the loyalty program.

5. The method of claim 1, wherein the entity imposes a lower threshold on the quantity of non-negotiable credits able to be converted via conversion option the Web pages, wherein the lower threshold is greater than one hundred non-negotiable credits.

6. The method of claim 1, wherein the loyalty program of the entity is an airline, hotel, or credit card loyalty program, wherein the different loyalty program of the commerce partner is an airline, hotel, or credit card loyalty program.

7. The method of claim 1, wherein the computer serves the set of one or more Web pages, receives the selection, and serves the one or more Web pages or Web page updates that include the effectuated changes within a single user-interactive Web session with the member.

8. The method of claim 1, wherein the entity has contractual agreements with a plurality of different commerce partners establishing different agreed upon conversion ratios and different compensation amounts owed by the entity to the different commerce partners for exchanging non-negotiable credits of the loyalty program for funds of loyalty programs of the different commerce partners, wherein said Web pages when rendered within the graphical user interface show the different agreed upon conversion ratios to the member.

9. The method of claim 1, wherein the loyalty program is a hotel loyalty program, wherein the entity services are lodging services, wherein the non-negotiable credits are redeemable for the entity services by the member via Web pages served by the computer, wherein the different loyalty program is an airline, rental car, train, or cruise ship loyalty program, wherein the commerce partner services are at least one of:
   travel services for an airline,
   travel services for a train,
   travel services for a cruise ship, or
   vehicle rental services for a vehicle.

10. The method of claim 1, wherein the loyalty program is an airline loyalty program, wherein the entity services are travel services for an airline, wherein the non-negotiable credits are redeemable for the entity services by the member via Web pages served by the computer, wherein the different loyalty program is a hotel, rental car, train, or cruise ship loyalty program, wherein the commerce partner services are at least one of:
   lodging services for a hotel,
   travel services for a train,
   travel services for a cruise ship, or
   vehicle rental services for a vehicle.

11. The method of claim 1, wherein the loyalty program is a credit card program, wherein the entity is a financial service company that provides a credit card to the member, wherein the non-negotiable credits are redeemable for the entity services by the member via Web pages served by the computer, wherein the different loyalty program is a hotel, airline, rental car, train, or cruise ship loyalty program, wherein the commerce partner services are at least one of:
   lodging services for a hotel,
   travel services for an airline,
   travel services for a train,
   travel services for a cruise ship, or
   vehicle rental services for a vehicle.

12. A method comprising:
   a computer serving a set of one or more Web pages for a different loyalty program of a commerce partner to one or more remotely located client machines, wherein the Web pages are able to be rendered within a client-side browser as a graphical user interface on the one or more client machines, wherein upon being rendered within the client-side browser said graphical user interface shows a quantity of entity independent funds, wherein said entity independent funds are different loyalty points of the different loyalty program possessed by a member, wherein upon being rendered within the client-side browser the graphical user interface comprises a conversion option to convert at least a subset of non-negotiable credits into a quantity of the entity independent funds, wherein said non-negotiable credits are loyalty points of a loyalty program of an entity, wherein the loyalty points are possessed by the member, wherein the loyalty points are stored in a loyalty program account owned or controlled by the entity, wherein the commerce partner does not own or control the loyalty program account, wherein the entity independent funds are possessed by the member, wherein the different loyalty points are stored in a funds account owned or controlled by the commerce partner, wherein the commerce partner redeems the different loyalty points for a set of commerce partner services that the commerce partner provides to the member, wherein the loyalty points are redeemable by the entity for a set of entity services that the entity provides to the member, wherein the commerce partner does not provide the commerce partner services in exchange for loyalty points unless these loyalty points are first converted into the different loyalty points, wherein the entity independent funds are not redeemable with the entity for the set of entity services that the entity provides to the member, wherein an agreement exists between the commerce partner and the entity, wherein the agreement permits members to convert the non-negotiable credits to the entity independent funds, wherein the agreement specifies that the entity is to compensate the commerce partner in an agreed upon amount of cash or credit for conversions of non-negotiable credits to entity independent funds;

the computer responsive to receiving a message indicating a selection of the conversion option, processing the selection to effectuate changes in the served set of Web pages; and responsive to the processing, the computer serving one or more Web pages or Web page updates that include the effectuated changes to the one or more remotely located client machines, wherein upon being rendered within the client-side browser the graphical user interface is updated with the effectuated changes, wherein the updated graphical user interface shows an increased quantity of entity independent funds possessed by the member, said increased quantity resulting at least in part from the subset of non-negotiable credits being converted into the quantity of entity independent funds.

13. The method of claim 12, wherein the entity services provided by the entity for which the non-negotiable credits are redeemable with the entity comprise at least one of:
   travel services for an airlines,
   travel services for a train,
   travel services for a cruise ship,
   vehicle rental services for a vehicle, or
   lodging services for lodging the member,
wherein the commerce partner services provided by the commerce partner for which the entity independent funds are redeemable with the commerce partner comprise at least one of:
   travel services for an airlines,
   travel services for a train,
   travel services for a cruise ship,
   vehicle rental services for a vehicle, or
   lodging services for lodging the member.

14. The method of claim 12, wherein the Web pages do not permit the member to redeem the non-negotiable credits for any of the entity services provided by the entity, wherein redeeming the non-negotiable credits occurs through an set of Web pages not owned or directly controlled by the commerce partner and not owned or directly controlled by any subsidiary or parent of the commerce partner.

15. The method of claim 12, wherein the commerce partner charges the member a fee for converting the non-negotiable credits to the entity independent funds, wherein the fee is specified in terms-of-use of the different loyalty program.

16. The method of claim 12, wherein the commerce partner imposes a lower threshold on the quantity of non-negotiable credits able to be converted via conversion option the Web pages, wherein the lower threshold is greater than one hundred non-negotiable credits.

17. The method of claim 12, wherein the loyalty program of the entity is an airline, hotel, or credit card loyalty program, and wherein the different loyalty program of the commerce partner is an airline, hotel, or credit card loyalty program.

18. The method of claim 12, wherein the computer serves the set of one or more Web pages, receives the selection, and serves the one or more Web pages or Web page updates that include the effectuated changes within a single user-interactive Web session.

19. The method of claim 12, wherein the commerce partner has contractual agreements with a plurality of different entities establishing different agreed upon conversion ratios and different compensation amounts owed by the different entities to the commerce partner for exchanging non-negotiable credits of the different entities for entity independent funds of the commerce partner, wherein said Web pages when rendered within the graphical user interface show the different agreed upon conversion ratios to the member.

20. The method of claim 12, wherein the different loyalty program is a hotel loyalty program, wherein the commerce partner services are lodging services, wherein the entity independent funds are redeemable for the commerce partner services by the member via Web pages served by the computer, wherein the loyalty program is an airline, rental car, train, or cruise ship loyalty program, wherein the entity services are at least one of:
   travel services for an airline,
   travel services for a train,
   travel services for a cruise ship, or
   vehicle rental services for a vehicle.

21. The method of claim 12, wherein the different loyalty program is an airline loyalty program, wherein the commerce partner services are travel services for an airline, wherein the entity independent funds are redeemable for the commerce partner services by the member via Web pages served by the computer, wherein the loyalty program is a hotel, rental car, train, or cruise ship loyalty program, wherein the entity services are at least one of:
   lodging services for a hotel,
   travel services for a train,
   travel services for a cruise ship, or
   vehicle rental services for a vehicle.

22. The method of claim 12, wherein the different loyalty program is a credit card program, wherein the commerce partner is a financial service company that provides a credit card to the member, wherein the entity independent funds are redeemable for the commerce partner services by the member via Web pages served by the computer, wherein the loyalty program is a hotel, airline, rental car, train, or cruise ship loyalty program, wherein the entity services are at least one of:
   lodging services for a hotel,
   travel services for an airline,
   travel services for a train,
   travel services for a cruise ship, or
   vehicle rental services for a vehicle.

23. A method comprising:
   a computer, comprising hardware, presenting a graphical user interface (GUI) on a display to a service agent and/or a machine manipulated by the service agent, wherein the service agent is a human agent authorized to act on behalf of an entity or a commerce partner, said graphical user interface showing a quantity of non-negotiable credits, wherein said non-negotiable credits are loyalty points of a loyalty program of the entity, wherein said shown quantity of non-negotiable credits are possessed by a member, wherein said shown quantity of non-negotiable credits were previously earned through previous interactions involving the loyalty program, wherein the non-negotiable credits are maintained in a loyalty program account owned or controlled by the entity, wherein the entity redeems the loyalty points for a set of entity services that the entity provides to the member, the graphical user interface comprising a conversion option to convert at least a subset of the shown non-negotiable credits into a quantity entity independent funds, wherein said entity independent funds are different loyalty points of a different loyalty program of the commerce partner, wherein said entity independent funds are possessed by the member and are maintained in a funds account owned or controlled by the commerce partner, wherein the funds account is not owned or controlled by the entity or by any subsidiary or parent of the entity, wherein the commerce partner redeems the different loyalty points for a set of commerce partner services that the commerce partner provides to the member, wherein an agreement exists between the entity and the commerce partner, wherein the agreement permits the service agent to convert quantities of the non-negotiable credits to quantities of the entity independent funds, wherein the agreement specifies that the entity is to compensate the commerce partner in an agreed upon amount of cash or credit for conversions of non-negotiable credits to entity independent funds;

the computer receiving a selection of the conversion option; and responsive to the received selection being processed, the computer presenting within the graphical user interface a reduced quantity of non-negotiable credits possessed by the member, said reduced quantity resulting at least in part from converting the subset of non-negotiable credits into the quantity of entity independent funds in accordance with the fixed credits-to-funds conversion ratio, wherein the computer presents the graphical user interface to the service agent, receives the selection, and presents the reduced quantity of non-negotiable credits within a single user-interactive session.

24. The method of claim 23, wherein the entity services provided by the entity for which the non-negotiable credits are redeemable with the entity comprise at least one of:
    travel services for an airlines,
    travel services for a train,
    travel services for a cruise ship,
    vehicle rental services for a vehicle, or
    lodging services for lodging the member,
wherein the commerce partner services provided by the commerce partner for which the entity independent funds are redeemable with the commerce partner comprise at least one of:
    travel services for an airlines,
    travel services for a train,
    travel services for a cruise ship,
    vehicle rental services for a vehicle, or
    lodging services for lodging the member.

25. The method of claim 23, wherein the loyalty program is an airline, hotel, or credit card loyalty program, wherein the different loyalty program is an airline, hotel, or credit card loyalty program.

26. The method of claim 23, wherein the service agent is an employee of an airline, a hotel, a credit card company, or of a company providing customer service for the loyalty program or for the different loyalty program, wherein the loyalty program is an airline, hotel, or credit card loyalty program, and wherein the different loyalty program is an airline, hotel, or credit card loyalty program.

27. The method of claim 23, wherein the service agent is an employee of a hotel, is an employee of a company providing customer service for the hotel, or is an employee of a company providing customer service for the loyalty program, wherein the loyalty program is a hotel loyalty program, wherein the entity services comprise lodging services for the hotel, wherein the different loyalty program is an airline, rental car, train, or cruise ship loyalty program, wherein the commerce partner services are at least one of:
    travel services for an airline,
    travel services for a train,
    travel services for a cruise ship, or
    vehicle rental services for a vehicle.

28. The method of claim 23, wherein the service agent is an employee of an airline, is an employee of a company providing customer service for the airline, or is an employee of a company providing customer service for the loyalty program, wherein the loyalty program is an airline loyalty program, wherein the entity services comprise travel services for the airline, wherein the different loyalty program is a hotel, rental car, train, or cruise ship loyalty program, wherein the commerce partner services are at least one of:
    lodging services for a hotel,
    travel services for a train,
    travel services for a cruise ship, or
    vehicle rental services for a vehicle.

29. The method of claim 23, wherein the service agent is an employee of a financial service company, is an employee of a company providing customer service for the financial service company, or is an employee of a company providing customer service for the loyalty program, wherein the loyalty program is an credit card loyalty program, wherein the entity is the financial service company that provides a credit card to the member, wherein the different loyalty program is a hotel, airline, rental car, train, or cruise ship loyalty program, wherein the commerce partner services are at least one of:
    lodging services for a hotel,
    travel services for an airline,
    travel services for a train,
    travel services for a cruise ship, or
    vehicle rental services for a vehicle.

30. A method comprising:
    a computer serving a set of one or more Web pages for a loyalty program of an entity to one or more remotely located client machines, wherein the Web pages are able to be rendered within a client-side browser as a graphical user interface on the one or more client machines, wherein upon being rendered within the client-side browser said graphical user interface shows a quantity of non-negotiable credits, wherein said non-negotiable credits are loyalty points of the loyalty program possessed by a member, wherein the loyalty points are maintained in a loyalty program account owned or controlled by the entity, wherein the entity redeems the loyalty points for a set of entity services that the entity provides to the member, wherein the entity services for which the non-negotiable credits are redeemable via Web pages served by the computer comprise:
        travel services for an airline owned, operated, or managed by the entity or by a subsidiary or parent of the entity, or lodging services for a hotel owned, operated, or managed by the entity or by a subsidiary or parent of the entity, wherein upon being rendered within the client-side browser the graphical user interface comprises a conversion option to convert at least a subset of the shown non-negotiable credits into a quantity entity independent funds, wherein said entity independent funds are different loyalty points of a different loyalty program of a commerce partner, wherein the different loyalty points are redeemable by the commerce partner for commerce partner services that the commerce partner provides to the member, wherein the commerce partner services for which the entity independent funds are redeemable comprise:
- travel services for an airline owned, operated, or managed by the commerce partner or by a subsidiary or parent of the commerce partner,
- lodging services for a hotel owned, operated, or managed by the commerce partner or by a subsidiary or parent of the commerce partner,
- travel services for a train owned, operated, or managed by the commerce partner or by a subsidiary or parent of the commerce partner,
- travel services for a cruise ship owned, operated, or managed by the commerce partner or by a subsidiary or parent of the commerce partner, or
- vehicle rental services for a vehicle owned, operated, or managed by the commerce partner or by a subsidiary or parent of the commerce partner, wherein the loyalty program of the entity is an airline or hotel loyalty program, wherein the different loyalty program of the commerce partner is a hotel, airline, rental car, train, or cruise ship loyalty program, wherein said entity independent funds are possessed by the member and are maintained in a funds account, wherein the funds account is neither owned nor controlled by the entity or by any subsidiary or parent of the entity, wherein the entity does not accept the entity independent funds as payment for any of the entity services, wherein an agreement exists between the entity and the commerce partner, wherein the agreement permits members to convert the non-negotiable credits to the entity independent funds, wherein the agreement specifies that the entity is to compensate the commerce partner in an agreed upon amount of cash or credit for conversions of non-negotiable credits to entity independent funds;
- the computer responsive to receiving a message indicating a selection of the conversion option, processing the selection to effectuate changes in the served set of Web pages; and
- responsive to the processing, the computer serving one or more Web pages or Web page updates that include the effectuated changes to the one or more remotely located client machines, wherein upon being rendered within the client-side browser the graphical user interface is updated with the effectuated changes, wherein the updated graphical user interface shows a reduced quantity of non-negotiable credits possessed by the member in the loyalty program, said reduced quantity resulting at least in part from the subset of non-negotiable credits being converted into the quantity of entity independent funds, wherein the computer serves the set of one or more Web pages, receives the selection, and serves the one or more Web pages or Web page updates that include the effectuated changes within a single user-interactive Web session with the member.

31. The method of claim 30, wherein the entity services are travel services for an airline owned, operated, or managed by the entity or by a subsidiary or parent of the entity.

32. The method of claim 30, wherein the entity services are lodging services for a hotel owned, operated, or managed by the entity or by a subsidiary or parent of the entity.

33. A method comprising:
- a computer serving a set of one or more Web pages for a different loyalty program of a commerce partner to one or more remotely located client machines, wherein the Web pages are able to be rendered within a client-side browser as a graphical user interface on the one or more client machines, wherein upon being rendered within the client-side browser said graphical user interface shows a quantity of entity independent funds, wherein said entity independent funds are different loyalty points of the different loyalty program possessed by a member, wherein upon being rendered within the client-side browser the graphical user interface comprises a conversion option to convert at least a subset of non-negotiable credits into a quantity of the entity independent funds, wherein said non-negotiable credits are loyalty points of a loyalty program of an entity, wherein the loyalty points are possessed by the member, wherein the loyalty points are stored in a loyalty program account owned or controlled by the entity, wherein the commerce partner does not own or control the loyalty program account, wherein the entity independent funds are possessed by the member, wherein the different loyalty points are stored in a funds account owned or controlled by the commerce partner, wherein the commerce partner redeems the different loyalty points for a set of commerce partner services that the commerce partner provides to the member, wherein the commerce partner services for which the different loyalty points are redeemable via Web pages served by the computer comprise:
  - travel services for an airline owned, operated, or managed by the commerce partner or by a subsidiary or parent of the commerce partner, or
  - lodging services for a hotel owned, operated, or managed by the commerce partner or by a subsidiary or parent of the commerce partner, wherein the loyalty points are redeemable by the entity for a set of entity services that the entity provides to the member, wherein the entity services for which the loyalty points are redeemable comprise:
- travel services for an airline owned, operated, or managed by the entity or by a subsidiary or parent of the entity,
- lodging services for a hotel owned, operated, or managed by the entity or by a subsidiary or parent of the entity,
- travel services for a train owned, operated, or managed by the entity or by a subsidiary or parent of the entity,
- travel services for a cruise ship owned, operated, or managed by the entity or by a subsidiary or parent of the entity, or
- vehicle rental services for a vehicle owned, operated, or managed by the entity or by a subsidiary or parent of the entity, wherein the different loyalty program of the commerce partner is an airline or hotel loyalty program, wherein the loyalty program of the entity is a hotel, airline, rental car, train, or cruise ship loyalty program, wherein the commerce partner does not provide the commerce partner services in exchange for loyalty points unless these loyalty points are first converted into the different loyalty points, wherein the entity independent funds are not redeemable with the entity for the set of entity services that the entity provides to the member, wherein an agreement exists between the commerce partner and the entity, wherein the agreement permits members to convert the non-negotiable credits to the entity independent funds, wherein the agreement specifies that the entity is to compensate the commerce partner in an agreed upon amount of cash or credit for conversions of non-negotiable credits to entity independent funds;

the computer responsive to receiving a message indicating a selection of the conversion option, processing the selection to effectuate changes in the served set of Web pages; and responsive to the processing, the computer serving one or more Web pages or Web page updates that include the effectuated changes to the one or more remotely located client machines, wherein upon being rendered within the client-side browser the graphical user interface is updated with the effectuated changes, wherein the updated graphical user interface shows an increased quantity of entity independent funds possessed by the member, said increased quantity resulting at least in part from the subset of non-negotiable credits being converted into the quantity of entity independent funds, wherein the computer serves the set of one or more Web pages, receives the selection, and serves the one or more Web pages or Web page updates that include the effectuated changes within a single user-interactive Web session with the member.

34. The method of claim 33, wherein the commerce partner services are travel services for an airline owned, operated, or managed by the commerce partner or by a subsidiary or parent of the commerce partner.

35. The method of claim 33, wherein the commerce partner services are lodging services for a hotel owned, operated, or managed by the commerce partner or by a subsidiary or parent of the commerce partner.

36. A method comprising:

a computer, comprising hardware, presenting a graphical user interface (GUI) on a display to a service agent and/or a machine manipulated by the service agent, wherein the service agent is a human agent authorized to act on behalf of an entity or a commerce partner, said graphical user interface showing a quantity of non-negotiable credits, wherein said non-negotiable credits are loyalty points of a loyalty program of the entity, wherein said shown quantity of non-negotiable credits are possessed by a member, wherein said shown quantity of non-negotiable credits were previously earned through previous interactions involving the loyalty program, wherein the non-negotiable credits are maintained in a loyalty program account owned or controlled by the entity, wherein the entity redeems the loyalty points for a set of entity services that the entity provides to the member, wherein the entity services for which the non-negotiable credits are redeemable via Web pages served by the computer comprise:

travel services for an airline owned, operated, or managed by the entity or by a subsidiary or parent of the entity, or lodging services for a hotel owned, operated, or managed by the entity or by a subsidiary or parent of the entity, wherein the graphical user interface comprises a conversion option to convert at least a subset of the shown non-negotiable credits into a quantity entity independent funds, wherein said entity independent funds are different loyalty points of a different loyalty program of the commerce partner, wherein said entity independent funds are possessed by the member and are maintained in a funds account owned or controlled by the commerce partner, wherein the funds account is not owned or controlled by the entity or by any subsidiary or parent of the entity, wherein the commerce partner redeems the different loyalty points for a set of commerce partner services that the commerce partner provides to the member, wherein the commerce partner services for which the entity independent funds are redeemable comprise:

travel services for an airline owned, operated, or managed by the commerce partner or by a subsidiary or parent of the commerce partner, or lodging services for a hotel owned, operated, or managed by the commerce partner or by a subsidiary or parent of the commerce partner, travel services for a train owned, operated, or managed by the commerce partner or by a subsidiary or parent of the commerce partner, travel services for a cruise ship owned, operated, or managed by the commerce partner or by a subsidiary or parent of the commerce partner, or vehicle rental services for a vehicle owned, operated, or managed by the commerce partner or by a subsidiary or parent of the commerce partner, wherein the loyalty program of the entity is an airline or hotel loyalty program, wherein the different loyalty program of the commerce partner is a hotel, airline, rental car, train, or cruise ship loyalty program, wherein an agreement exists between the entity and the commerce partner, wherein the agreement permits the service agent to convert quantities of the non-negotiable credits to quantities of the entity independent funds, wherein the agreement specifies that the entity is to compensate the commerce partner in an agreed upon amount of cash or credit for conversions of non-negotiable credits to entity independent funds;

the computer receiving a selection of the conversion option; and responsive to the received selection being processed, the computer presenting within the graphical user interface a reduced quantity of non-negotiable credits possessed by the member, said reduced quantity resulting at least in part from converting the subset of non-negotiable credits into the quantity of entity independent funds in accordance with the fixed credits-to-funds conversion ratio, wherein the computer presents the graphical user interface to the service agent, receives the selection, and presents the reduced quantity of non-negotiable credits within a single user-interactive session.

37. The method of claim 36, wherein the entity services are travel services for an airline owned, operated, or managed by the entity or by a subsidiary or parent of the entity.

38. The method of claim 36, wherein the entity services are lodging services for a hotel owned, operated, or managed by the entity or by a subsidiary or parent of the entity.

\* \* \* \* \*